US012189652B2

(12) United States Patent
Psaroudakis et al.

(10) Patent No.: US 12,189,652 B2
(45) Date of Patent: *Jan. 7, 2025

(54) LANGUAGE INTEROPERABLE RUNTIME ADAPTABLE DATA COLLECTIONS

(71) Applicant: Oracle International Corporation, Redwood City, CA (US)

(72) Inventors: Iraklis Psaroudakis, Zurich (CH); Stefan Kaestle, Zurich (CH); Daniel J. Goodman, Bagillt (GB); Jean-Pierre Lozi, Zurich (CH); Matthias Grimmer, Aurolzmünster (AT); Timothy L. Harris, Cambridge (GB)

(73) Assignee: Oracle International Corporation, Redwood City, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/174,535

(22) Filed: Feb. 24, 2023

(65) Prior Publication Data

US 2023/0214407 A1 Jul. 6, 2023

Related U.S. Application Data

(63) Continuation of application No. 17/067,479, filed on Oct. 9, 2020, now Pat. No. 11,593,398, which is a (Continued)

(51) Int. Cl.
G06F 9/455 (2018.01)
G06F 9/54 (2006.01)
G06F 16/27 (2019.01)
(52) U.S. Cl.
CPC .......... *G06F 16/27* (2019.01); *G06F 9/45516* (2013.01); *G06F 9/45558* (2013.01);
(Continued)

(58) Field of Classification Search
CPC ............... G06F 16/27; G06F 9/45516; G06F 9/45558; G06F 9/54; G06F 2009/4557;
(Continued)

(56) References Cited

U.S. PATENT DOCUMENTS 5,546,584 A    8/1996   Lundin et al.
6,314,429 B1 * 11/2001   Simser ...................... G06F 8/51
                                                          717/137

(Continued)

FOREIGN PATENT DOCUMENTS

CN         105793818 A   *   7/2016   ............... G06F 8/51
CN         107665216 A   *   2/2018   ......... G06F 16/2433
WO    WO-2017145899 A1 *   8/2017   ............ G06F 11/273

OTHER PUBLICATIONS

Gilles Duboscq et al, "An Intermediate Representation for Speculative Optimizations in a Dynamic Compiler", Oct. 28, 2013, pp. 1-10.

(Continued)

*Primary Examiner* — Phuong Thao Cao
(74) *Attorney, Agent, or Firm* — Robert C. Kowert; Kowert, Hood, Munyon, Rankin & Goetzel, P.C.

(57) ABSTRACT

Adaptive data collections may include various type of data arrays, sets, bags, maps, and other data structures. A simple interface for each adaptive collection may provide access via a unified API to adaptive implementations of the collection. A single adaptive data collection may include multiple, different adaptive implementations. A system configured to implement adaptive data collections may include the ability to adaptively select between various implementations, either manually or automatically, and to map a given workload to differing hardware configurations. Additionally, hardware resource needs of different configurations may be predicted from a small number of workload measurements. Adaptive data collections may provide language interoperability, such (Continued)

as by leveraging runtime compilation to build adaptive data collections and to compile and optimize implementation code and user code together. Adaptive data collections may also provide language-independent such that implementation code may be written once and subsequently used from multiple programming languages.

20 Claims, 10 Drawing Sheets

Related U.S. Application Data continuation of application No. 16/165,593, filed on Oct. 19, 2018, now Pat. No. 10,803,087.

(52) U.S. Cl.
CPC ........ *G06F 9/54* (2013.01); *G06F 2009/4557* (2013.01); *G06F 2009/45583* (2013.01); *G06F 2009/45595* (2013.01)

(58) Field of Classification Search
CPC ............ G06F 2009/45583; G06F 2009/45595; G06F 9/5005
USPC .......................................................... 707/634
See application file for complete search history.

(56) References Cited

U.S. PATENT DOCUMENTS

| | | | | |
|---|---|---|---|---|
| 6,792,392 | B1* | 9/2004 | Knight | G06F 11/3466 |
| | | | | 702/182 |
| 7,010,796 | B1 | 3/2006 | Strom et al. | |
| 7,120,678 | B2* | 10/2006 | Greuel | H04L 41/0213 |
| | | | | 707/999.001 |
| 7,801,880 | B2* | 9/2010 | Kapadia | G06F 16/951 |
| | | | | 707/706 |
| 8,515,014 | B2* | 8/2013 | Blackburn | H04M 3/306 |
| | | | | 379/1.04 |
| 8,683,318 | B1* | 3/2014 | Dasari | G06F 40/151 |
| | | | | 717/118 |
| 8,793,371 | B1 | 7/2014 | Nanekar et al. | |
| 9,329,899 | B2 | 5/2016 | Ailamaki et al. | |
| 9,983,903 | B2 | 5/2018 | Ailamaki et al. | |
| 10,042,673 | B1* | 8/2018 | Espy | G06F 9/5011 |
| 10,067,955 | B1* | 9/2018 | Wu | G06F 16/285 |
| 10,803,087 | B2 | 10/2020 | Psaroudakis et al. | |
| 11,163,481 | B2* | 11/2021 | Iyengar | G06F 3/0683 |
| 11,593,398 | B2 | 2/2023 | Psaroudakis et al. | |
| 2001/0011371 | A1 | 8/2001 | Tang | |
| 2003/0023773 | A1 | 1/2003 | Lee et al. | |
| 2004/0143810 | A1* | 7/2004 | Ahmed | G06Q 10/10 |
| | | | | 717/100 |
| 2005/0021998 | A1* | 1/2005 | Fiedler | H04L 41/18 |
| | | | | 726/26 |
| 2005/0204368 | A1 | 9/2005 | Ambekar et al. | |
| 2006/0184338 | A1* | 8/2006 | Lightstone | G06F 11/3447 |
| | | | | 702/182 |
| 2007/0169017 | A1 | 7/2007 | Coward | |
| 2008/0005728 | A1 | 1/2008 | Morris | |
| 2008/0281939 | A1* | 11/2008 | Frazier | G06F 16/21 |
| | | | | 709/213 |
| 2008/0307392 | A1* | 12/2008 | Racca | G06Q 10/06 |
| | | | | 717/120 |
| 2010/0088117 | A1* | 4/2010 | Belden | G16H 30/20 |
| | | | | 707/741 |
| 2011/0231835 | A1 | 9/2011 | Smith et al. | |
| 2013/0074058 | A1 | 3/2013 | Gounares et al. | |
| 2013/0081005 | A1 | 3/2013 | Gounares et al. | |
| 2014/0304719 | A1* | 10/2014 | Pope | G06F 9/546 |
| | | | | 719/328 |
| 2015/0324191 | A1* | 11/2015 | Agovic | G06F 8/71 |
| | | | | 717/120 |
| 2016/0139946 | A1* | 5/2016 | Gardner | G06F 9/5077 |
| | | | | 718/1 |
| 2017/0017674 | A1 | 1/2017 | Scheuer et al. | |
| 2017/0046137 | A1 | 2/2017 | Grimmer et al. | |
| 2018/0027060 | A1 | 1/2018 | Metsch et al. | |
| 2018/0246755 | A1 | 8/2018 | Ailamaki et al. | |
| 2018/0349433 | A1* | 12/2018 | Baines | G06F 16/258 |
| 2019/0087213 | A1 | 3/2019 | Matters et al. | |
| 2019/0342391 | A1* | 11/2019 | Jain | G06F 3/0689 |
| 2020/0089548 | A1 | 3/2020 | Kawahito | |
| 2020/0125668 | A1 | 4/2020 | Psaroudakis et al. | |
| 2020/0412691 | A1 | 12/2020 | Shribman et al. | |
| 2021/0200879 | A1 | 7/2021 | Gerzon et al. | |

OTHER PUBLICATIONS

Daniel Goodman et al, "Pandia: Comprehensive contention-sensitive thread placement", 2017, pp. 1-16.
Jason Ansel et al, "PetaBricks: A Language and Compiler for Algorithmic Choice", 2009, pp. 1-12.
Mohammad Dashti et al, "Traffic Management: A Holistic Approach to Memory Placement on NUMA Systems", 2013, pp. 1-13.
Irina Calciu et al, "Black-box Concurrent Data Structures for NUMA Architectures", 2017, pp. 1-15.
Tim Harris et al, "Callisto-RTS: Fine-Grain Parallel Loops", 2015, pp. 1-13.
Stefan Kaestle et al, "Shoal: Smart allocation and replication of memory for parallel programs", 2015, pp. 1-15.
Christoph A. Schaefer et al, "Atune: IL: An Instrumentation Language for Auto-Tuning Parallel Application", 2009, pp. 1-11.
John D. McCalpin, "Memory Bandwidth and Machine Balance in Current High Performance Computers", Sep. 19, 1995, pp. 1-8.
David m. Beazley et al, "SWIG: An Easy to use tool for Integrating Scripting Languages with C and C++", 1996, pp. 1-18.
Sergey Blagodurov et al, "A Case for NUMA-aware Contention Management on Multicore Systems", pp. 1-15.
Jonathan Corbet, "AutoNUMA: the other approach to NUMA scheduling", 2012, pp. 1-5.
Orestis Polychroniou et al, "Efficient Lightweight Compression Alongside Fast Scans", 2015, pp. 1-6.
Iraklis Psaroudakis et al, "Dynamic Fine-Grained Scheduling for Energy-Efficient Main-Memory Queries", 2014, pp. 1-7.
Matthias Grimmer et al "High-Performance Cross-Language Interoperability in a Multi-Lanauge Runtime", 2015, pp. 1-13.
Jonathan Eastep et al, "Smartlocks: Lock Acquisition Scheduling for Self-Aware Synchronization" 2010, pp. 1-11.
Surajit Chaudhuri et al "Self-Tuning Database Systems: A Decade of Progress", 2007, pp. 1-12.
Iraklis Psaroudakis et al, "Adaptive NUMA-aware data placement and task scheduling for analytical workloads in main-memory column-stores", 2016, pp. 1-12.
Levon Stepanian et al, "Inlining Java Native Calls At Runtime", 2005, pp. 1-11.
Paolo Boldi et al, "The WebGraph Framework I: Compression Techniques", 2004, pp. 1-8.
Iraklis Psaroudakis et al, "Sharing Data and Work Across Concurrent Analytical Queries", 2013, pp. 1-12.
Iraklis Psaroudakis, "Scaling Up Concurrent Analytical Workloads on Multi-Core Servers", pp. 1-179.
Floian Wolf et al, "Extending Database Task Schedulers for Multi-threaded Application Code", pp. 1-12.
John Reppy et al, "Application-Specific Foreign-interface Generation", 2006, pp. 1-10.
Iraklis Psaroudakis et al, "Task Scheduling for Highly Concurrent Analytical and Transactional Main-Memory Workloads", pp. 1-11.
Anastasia Ailamaki et al, "How to Stop Under-Utilization and Love Multicores", pp. 1-4.
Baptiste Lepers et al, "Thread and Memory Placement on NUMA Systems", 2015, pp. 1-7.
Steffen Maass et al, "Mosaic: Processing a Trillion-Edge Graph on a Single Machine", 2017, pp. 1-17.
Iraklis Psaroudakis et al, "Reactive and Proactive Sharing Across Concurrent Analytical Queries", 2014, pp. 1-4.

(56) References Cited

OTHER PUBLICATIONS

Martin Sevenich et al "Using Domain-Specific Languages for Analytic Graph Databases", 2016, pp. 1-12.
Iraklis Psaroudakis et al "Scaling Up Concurrent Main-Memory col. Store Scans: Towards Adaptive NUMA-aware Data and Task Placement", 2015, pp. 1-12.
Markus Pilman et al, "Fast Scans on Key-Value Stores", 2017, pp. 1-12.
Gilles Duboscq et al, "Speculation Without Regret: Reducing Deoptimization Meta-Data in the Graal Compiler", pp. 1-7.
Matthias Grimmer et al, "Dynamically Composing Languages in a Modular Way: Supporting C Extensions for Dynamic Languages", 2015, pp. 1-13.
Joshua San Miguel et al "Doppelganger: A Cache for Approximate Computing", 2015, pp. 1-12.
Iraklis Psaroudakis et al "Scaling up Mixed Workloads: a Battle of Data Freshness, Flexibility, and Scheduling", pp. 1-16.
Thomas Wurthinger et al, "Self-Optimizing AST Interpreters", 2012, pp. 1-10.
Orestis PolyChronious et al, "Rethinking SIMD Vectorization for In-Memory Databases", 2015, pp. 1-16.
Matthew Parkinson et al, "Project Snowflake: Non-Blocking Safe Manual Memory Management in .NET", Jul. 26, 2017, pp. 1-40.
Lukas Stadler et al, "Partial Escape Analysis and Scalar Replacement for Java", 2014, pp. 1-10.
Manuel Rigger et al, "Bringing Low-Level Languages to the JVM: Efficient Execution of Llvm Ir on Truffle", 2016, pp. 1-10.
Anurag Khandelwal et al "ZipG: A Memory-efficient Graph Store for Interactive Queries", 2018, pp. 1-16.

\* cited by examiner

LANGUAGE INTEROPERABLE RUNTIME ADAPTABLE DATA COLLECTIONS

This application is a continuation of U.S. patent application Ser. No. 17/067,479, filed Oct. 9, 2020, now U.S. Pat. No. 11,593,398, which is a continuation of U.S. patent application Ser. No. 16/165,593, filed Oct. 19, 2018, now U.S. Pat. No. 10,803,087, which is hereby incorporated by reference herein its entirety.

BACKGROUND

Field of the Disclosure

This disclosure relates to placement of memory, threads and data within multi-core systems, such as data analytics computers with multiple sockets per machine, multiple cores per socket, and/or multiple thread contexts per core.

Description of the Related Art

Modern computer systems, such as those used for data analytics are often systems with multiple sockets per machine, multiple cores per socket and multiple thread contexts per core. Obtaining high performance from these systems frequently requires the correct placement of data to be accessed within the machine. There have been increasing demands on systems to efficiently support big data processing, such as database management systems and graph processing systems, while attempting to store and process data in-memory.

However, traditional implementations of big-data analytics frameworks are generally slow and frequently involve recurring issues such as costly transfers of data between disk and main memory, inefficient data representations during processing, and excessive garbage collection activity in managed languages. Additionally, analytics workloads may be increasingly limited by simple bottlenecks within the machine, such as due to saturating the data transfer rate between processors and memory, saturating the interconnect between processors, saturating a core's functional units, etc.

Existing solutions may also exhibit workload dependencies, programming difficulties due to hardware characteristics, as well as programming language dependencies, thereby potentially limiting their usefulness in modern environments that frequently include a diverse range of different programming languages. Similarly, existing solutions require strictly defined interfaces between languages that treat native code as a black box, thus introducing a compilation barrier that can degrade performance.

Figure 1:
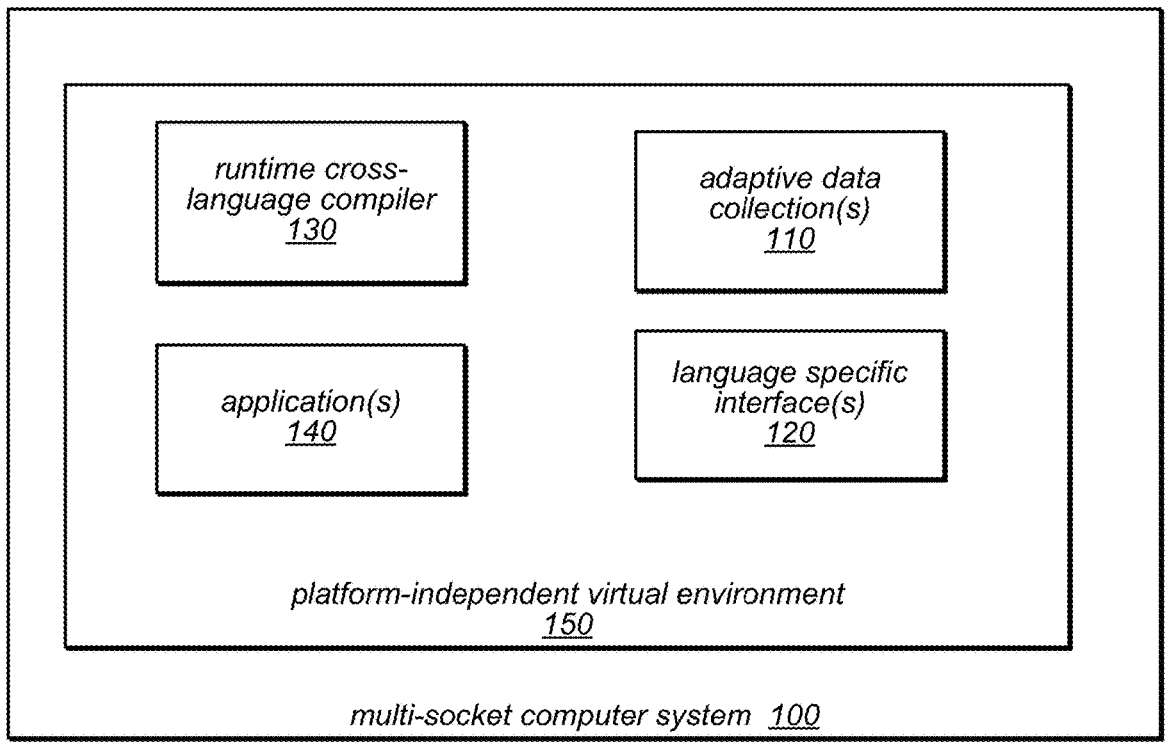
FIG. 1 is a logical block diagram illustrating an adaptive data collection implementation on a multi-socket computer system, according to one embodiment.

In the following detailed description, numerous specific details are set forth to provide a thorough understanding of claimed subject matter. However, it will be understood by those skilled in the art that claimed subject matter may be practiced without these specific details. In other instances, methods, apparatuses or systems are not described in detail below because they are known by one of ordinary skill in the art in order not to obscure claimed subject matter.

While various embodiments are described herein by way of example for several embodiments and illustrative drawings, those skilled in the art will recognize that embodiments are not limited to the embodiments or drawings described. It should be understood that the drawings and detailed description thereto are not intended to limit the embodiments to the particular form disclosed, but on the contrary, the intention is to cover all modifications, equivalents and alternatives falling within the spirit and scope of the disclosure. Any headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general-purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels.

Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

SUMMARY

Described herein are systems, methods, mechanisms and/or techniques for implementing language interoperable runtime adaptive data collections. Adaptive data collections may include various type of data arrays, sets, bags, maps, and other data structures. For each adaptive data collection, there may be a simple interface providing access via a unified application programming interface (API). Language interoperable runtime adaptive data collections, which may be referred to herein as simply "adaptive data collections" or "smart collections" (e.g., arrays, sets, bags, maps, etc.), may provide different adaptive (or smart) implementations and/or data functionalities of the same adaptive data collection interface. For example, various adaptive data functionalities may be developed for various data layouts, such as different Non-Uniform Memory Access (NUMA) aware data placements, different compression schemes (e.g., compression of data within a collection), different indexing schemes within a collection, different data synchronization schemes, etc.

A system configured to implement adaptive data collections may include the ability to adaptively select between various data functionalities, either manually or automatically, and to map a given workload to different hardware configurations (e.g., different resource characteristics). Various configurations specifying different data functionalities may be selected during an initial data collection configuration as well as dynamically during runtime, such as due to changing executing characteristics or resource characteristics (e.g., of the workload). Described herein are algorithms for dynamically adapting data functionalities (e.g., smart functionalities) to a given system and workload, according to various embodiments.

As described herein, adaptive data collections may provide language interoperability, such as by leveraging runtime compilation to build adaptive data collections as well as to efficiently compile and optimize data functionality code (e.g., smart functionalities) and the user code together. For example, in one embodiment a system configured to implement the methods, mechanisms and/or techniques described herein may implement adaptive NUMA-aware (Non-Uniform Memory Access) data placement and/or bit compression for data collections in a language-independent manner through runtime compilation. Adaptive data collections may also provide language-independent access to content and data functionalities, such that optimization code may be written once and subsequently reused via (e.g., accessed from) multiple programming languages. For example, according to one embodiment adaptive data collections implemented in C++ may be accessed from workloads written in C++ or other languages, such as Java, via runtime compilation.

Additionally, in some embodiments adaptive data collections may improve parallelism & scheduling, such as by integrating adaptive data collections with a runtime system in order to conveniently provide fine-grained parallelism and scheduling for the workloads that use adaptive data collections. Adaptive data collections may also provide adaptivity, such as by utilizing an adaptivity workflow that can predict hardware resource needs of different configurations (e.g., NUMA-aware data placement, bit compression, etc.) from a small number of workload measurements. Such adaptivity may provide a one-time adaptation or ongoing runtime adaptivity, according to various embodiments. For example, a system implementing adaptable data collections may select a particular adaptivity configuration for the data functionalities (e.g., the best configuration based on certain criteria) based at least in part on one or more predicted resource requirements (e.g., of a workload). A configuration may specify one or more data functionalities for a given data collections. For example, a configuration may specify a data placement functionality, such as a particular NUMA-aware data placement scheme, a compression algorithm for compression data of the data collection, an element indexing scheme for the data collection, etc.

System configured to implement adaptive data collections as described here may improve their performance (e.g., by exploiting adaptive data functionalities, such as NUMA-aware data placement, data compression, etc.), reduce hardware resource requirements (e.g., reducing main memory requirements though data compression, etc.) and/or simplify programming across multiple languages, thereby potentially reducing development and maintenance costs, according to various embodiments. In some embodiments, adaptive data collections, such as adaptive arrays may be integrated into a runtime system, such as to provide fine-grained efficient parallelism and scheduling to the workloads that access the adaptive data collections.

DETAILED DESCRIPTION OF EMBODIMENTS

As noted above, systems, methods, mechanisms and/or techniques described herein may, in some embodiments, implement a system for implementing adaptive data collections. An array may be considered one of the most prominent types of in-memory data collection or in-memory data structure. Various systems, methods, mechanisms and/or techniques for implementing adaptive data collections are described herein mainly in terms of arrays (e.g., adaptive or smart arrays). However, the systems, methods, mechanisms and/or techniques described herein may be applied to any suitable data collections or data structures. For example, adaptive data collections may be include arrays, sets, bags, maps and/or other data structures, according to various embodiments. For each adaptive data collection, there may a simple interface to access the collection via a unified API. For example, a map may have an interface to access the keys and associated values. Additionally, an adaptive data collection may have multiple, different data layout implementations in some embodiments.

FIG. 1 is a logical block diagram illustrating an adaptive data collection implementation on a multi-socket computer system, according to one embodiment. While FIG. 1 illustrates a system according to one example embodiment, the methods, mechanisms and/or techniques for implementing adaptive data collections described herein may be applicable to any application/system that uses data collections for storing and processing data. For example, adaptive data collections may be implemented on database management and graph processing systems, thereby potentially allowing those systems to utilize language-independent, and/or runtime adaptive, optimizations for NUMA-awareness and bit compression, according to various embodiments. A system, such as multi-socket computer system 100, configured to implement language interoperable runtime adaptable data collections may include (i.e., provide, execute, etc.) a platform-independent virtual environment 150, such as a Java-based virtual machine (VM) in one example embodiment, within which various other software components may execute. For example, one or more applications 140 may execute within (or be executed by) the virtual environment 150 and may be configured to utilize and/or access one or more adaptive data collections 110. A runtime cross language compiler 130 may be configured to optimize and/or compile (e.g., at runtime) both application (e.g., user) code and adaptive data collection code, such as one or more language specific interface(s) 120, according to various embodiments.

In order to support language interoperability efficiently and seamlessly to multi-language workloads that use adaptive data collections, the code of the adaptive data collection may be tailored to compile with runtime cross-language compiler 130. Additionally, adaptive data collections may be implemented on (or using) a platform-independent virtual environment 150 configured for compiling and running multi-language applications. In some embodiments platform-independent virtual environment 150 may include, or be configured to be, a language interpreter (i.e., of abstract syntax trees, bytecode, etc.) that may use the runtime cross-language compiler 130 to dynamically compile guest language applications to machine code. For example, the system may, according to one embodiment include language implementations for any of various languages, such as C/C++, JavaScript, Python, R, and Ruby, as a few examples. Thus in one example embodiment, adaptive data collections may be implemented using the Graal™ virtual machine (GraalVM) based on the Java HotSpot virtual machine (VM) including the Truffle™ language interpreter as well as Sulong™ (i.e., a Truffle implementation of LLVM bitcode).

Additionally, the system may also include an implementation of low level virtual machine (LLVM) bitcode, according to one embodiment. A LLVM may utilize one or more front end compilers to compile source languages to LLVM bitcode that may be interpreted on the platform-independent virtual environment (e.g., the VM).

Figure 2:
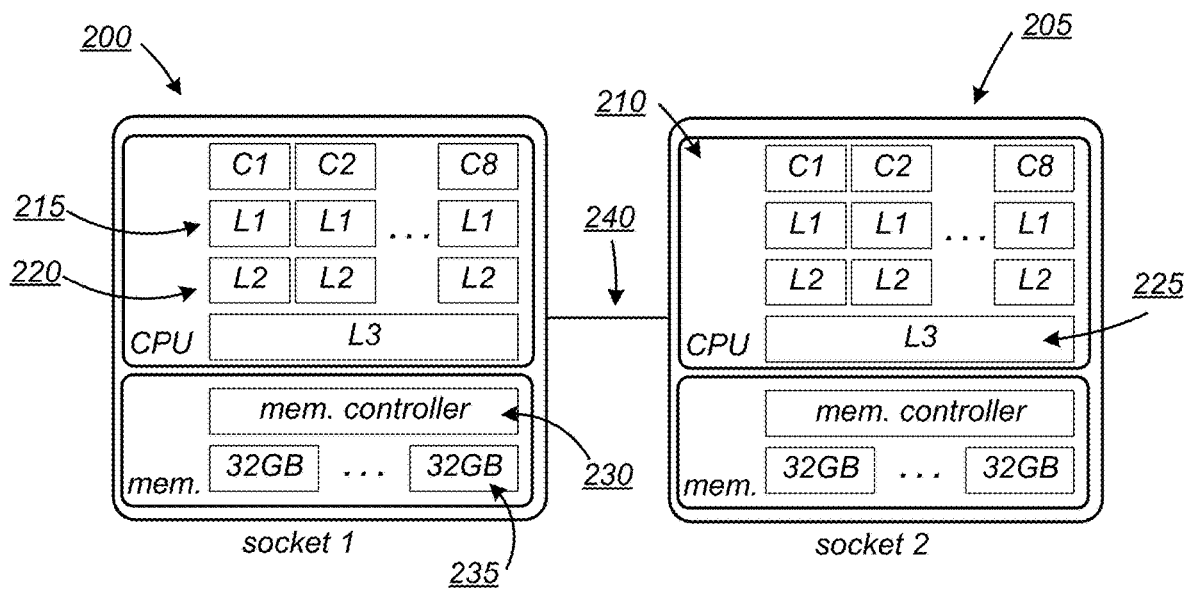
FIG. 2 is a logical block diagram illustrating one example technique for accessing an adaptive data collection, according to one embodiment.

In some embodiments, multi-socket computer system 100 may comprise one or more interconnected sockets of multi-core processors. Memory within the system 100 may be decentralized and attached to each socket in a cache-coherent non-uniform memory access (ccNUMA) architecture. FIG. 2 is a logical diagram illustrating an example machine with two sockets 200 and 205, each containing an 8-core CPU 210 with two hyper-threads per core, according to one example embodiment. Each core may have a L1-I/D 215 and L2 cache 220. Each CPU has a shared L3 last-level cache 225. Each socket may have four 32 GB DIMMs 235 as well as a memory controller 230, and the two sockets may be connected with an interconnect 240, such as Intel QuickPath Interconnect (QPI) 16 GB/s links in one example embodiment.

Although NUMA topologies may vary, such as by the number of sockets, processors, memory, interconnects, etc., there may be a few common fundamental performance characteristics, such as remote memory accesses being slower than local accesses, the bandwidth to a socket's memory and interconnect may be separately saturated, and the bandwidth of an interconnect is often much lower than a socket's local memory bandwidth. Thus, in some embodiments performance-critical applications may need to be NUMA-aware by using OS facilities to control the placement of data and of threads. For example, in one example operating system, the default data placement policy may be to physically allocate a virtual memory page on the particular socket on which the thread (e.g., that first touches the memory) is running (e.g., potentially after raising a page-fault). Other policies may include explicitly pinning pages on sockets and interleaving pages in a round-robin fashion across sockets.

In some embodiments, adaptive data collections may be implemented on a C++ runtime system, such as the Callisto runtime system (RTS) in one example embodiment, that supports parallel loops with dynamic distribution of loop iterations between worker threads. For example, in some embodiments, platform-independent virtual environment 150 may be (or may include, or may be part of) such a runtime system. Utilizing a RTS supporting parallel loops with dynamic distribution of loop iterations between worker threads may in some embodiments provide a programming model similar to dynamically scheduled loops except that the work distribution techniques may permit a more finely grained and scalable distribution of work (e.g., even on an 8-socket machine with 1024 hardware threads). In some embodiments, adaptive data collections may be implemented using a library (e.g., a Java library) to express loops. For example, the loop body may be written as a lambda function and each loop may execute over a pool of Java worker threads making calls from Java to C++ each time the worker requires a new batch of loop iterations with the fast-path distribution of work between threads occurring in C++. For example, Java Native Interface (JNI) calls may be used to interface between Java and C++. Additionally, in some embodiments the use of JNI may be designed to pass only scalar values, thus potentially avoiding typically costly cases.

The implementation of adaptive data collections, as described herein, may support additional data functionalities (e.g., smart functionalities) to express resource trade-offs, such as multiple data placement options within a NUMA machine and bit compression of the collection's content. Additionally, in some embodiments, adaptive data collections may support randomization, such as a fine-grained index-remapping of a collection's elements. This kind of permutation may, in some embodiments, ensure that "hot" nearby data items are mapped to storage on different locations served by different memory channels, thus potentially reducing hot-spots in the memory systems if one memory channel becomes saturated before others. In some embodiments, data placement techniques may be extended with partitioning data across the available threads based on domain specific knowledge. Moreover, alternative compression techniques may be utilized with adaptive data collections that may achieve higher compression rates on different categories of data, such as dictionary encoding, run-length encoding, etc. Furthermore, in some embodiments, adaptive data collections may include synchronization support and/or data synchronization schemes, such as to support both read-based and write-based concurrent workloads.

Similar to smart data functionalities, different data layouts may support different trade-offs between the use of hardware resources and performance. For example, in some embodiments, adaptive arrays may be used to implement data layouts for sets, bags, and maps, such as by encoding binary trees into arrays, where accessing individual elements may require up to log 2n non-local accesses (where n is the size of the collection). To trade size against performance hashing may be used in some embodiments instead of trees to index the adaptive arrays.

Figure 3A:
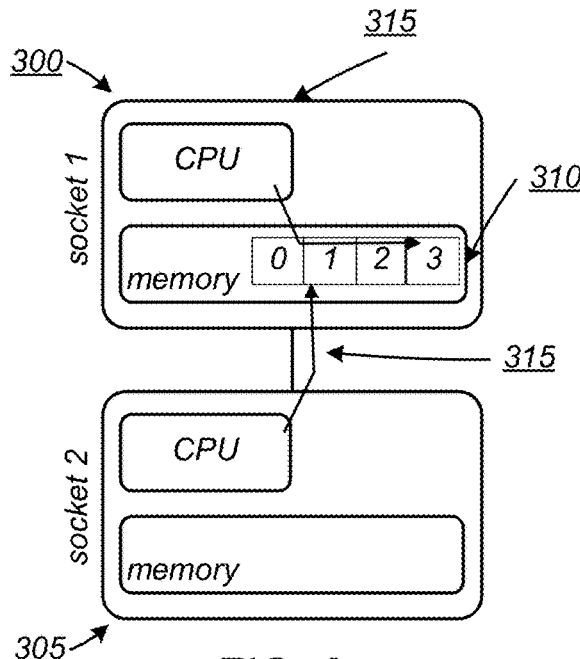
FIGS. 3a-3d are logical block diagrams illustrating example parallel array aggregation with different smart functionalities, according to one embodiment.
Figure 3B:
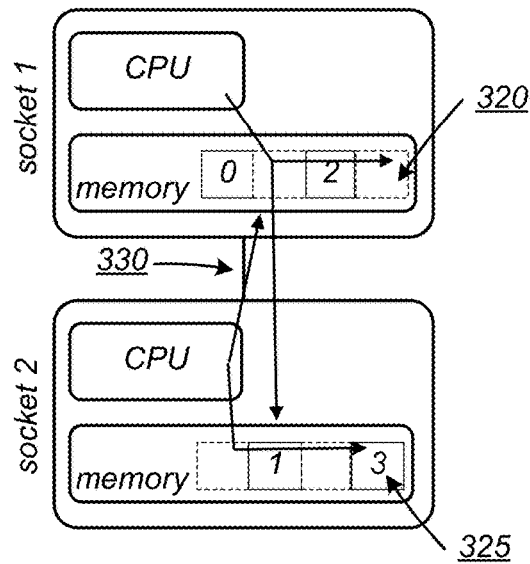
Figure 3C:
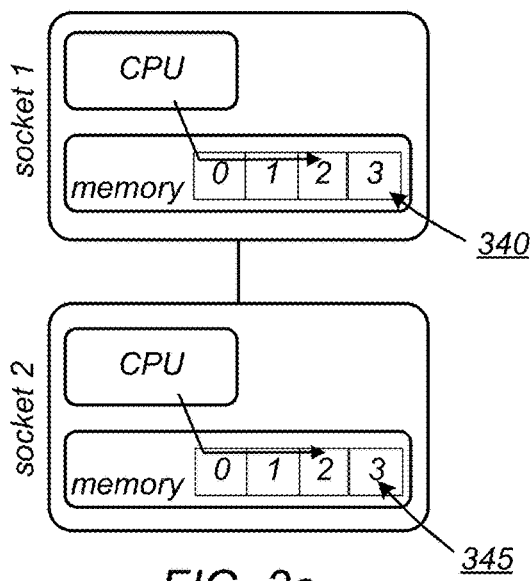
Figure 3D:
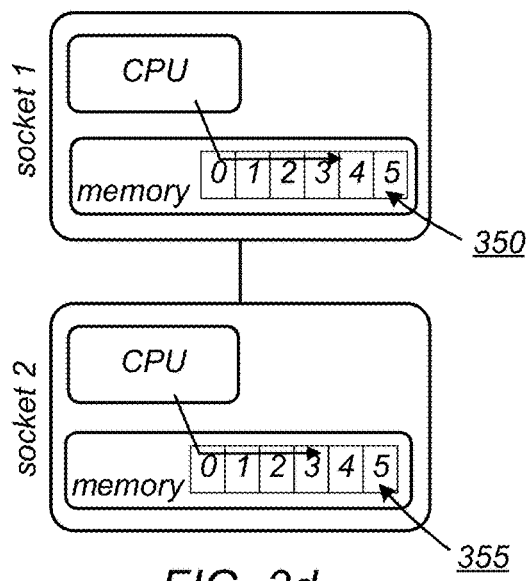

FIGS. 3a-3d are logical block diagrams illustrating examples of parallel array aggregation with different smart data functionalities. FIGS. 3a-3d illustrates smart data functionalities for a parallel summation of an array on a 2-socket NUMA machine, according to one example embodiment. When the array 310 is placed on a single socket 300 with accesses 315 coming from threads on both sockets 300, 305, as illustrated in FIG. 3a, the bottleneck may be the socket's memory bandwidth. When the array is interleaved 320, 325 across the machine's sockets, as illustrated in FIG. 3b (showing the same two sockets), both sockets' memory bandwidth may be used to decrease the execution time, and the bottleneck may be the interconnect 330. If the array is replicated 340, 345 across sockets using more memory space, as illustrated in FIG. 3c, memory access may be localized and the interconnect may be removed as a bottleneck to further decrease the execution time. Finally, memory bandwidth may be used more productively by compressing 350 and 355 the array's contents, as illustrated in FIG. 3d, such as to pass more elements through the same memory bandwidth and thereby potentially achieving better performance.

Figure 4:
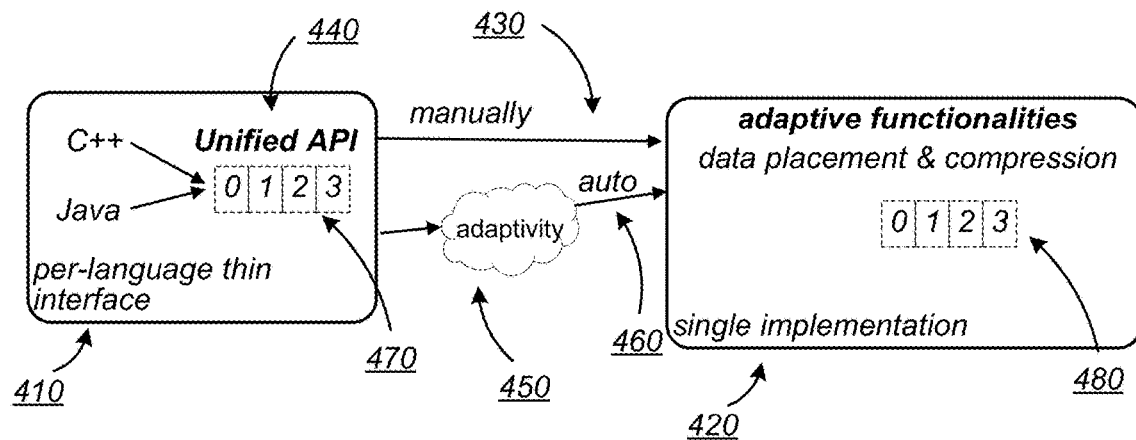
FIG. 4 is a logical block diagram illustrating one example of accessing an adaptive data collection (e.g., an adaptive array), according to one embodiment.

Additionally, adaptive data collections may provide language-independent access to their contents and smart data functionalities. For example, an adaptive data collection may be implemented once in one language, such as C++, but may be accessed from workloads written in other languages, such as C++ or Java. FIG. 4 is a logical block diagram illustrating one example of accessing an adaptive data collection (e.g., an adaptive array), according to one embodiment. The underlying data structure, such as single implementation array 480, accessible via thin interface 410 (illustrated by array 470) may be implemented once in one language (e.g., C++) and exposed to different languages via thin per-language wrappers, such as per-language thin interface 410. Various options regarding the implementation, such as what data placement to use and/or whether to use compression, etc., may be determined manually 230, such as by the programmer, or automatically 460 by the system during runtime, such as via adaptivity mechanism 450, according to various embodiments. The connection between thin interface 410 and single implementation 420 may be set (e.g., configured) at compile time and all versions (e.g., instances, embodiments, etc.) of a given data collection may use the same API. Additionally, thin interfaces in different language may target the same API. Thus, application code may be able to access array 480 via unified API 440 regardless of the particular language(s) with witch the application was developed.

Figure 5:
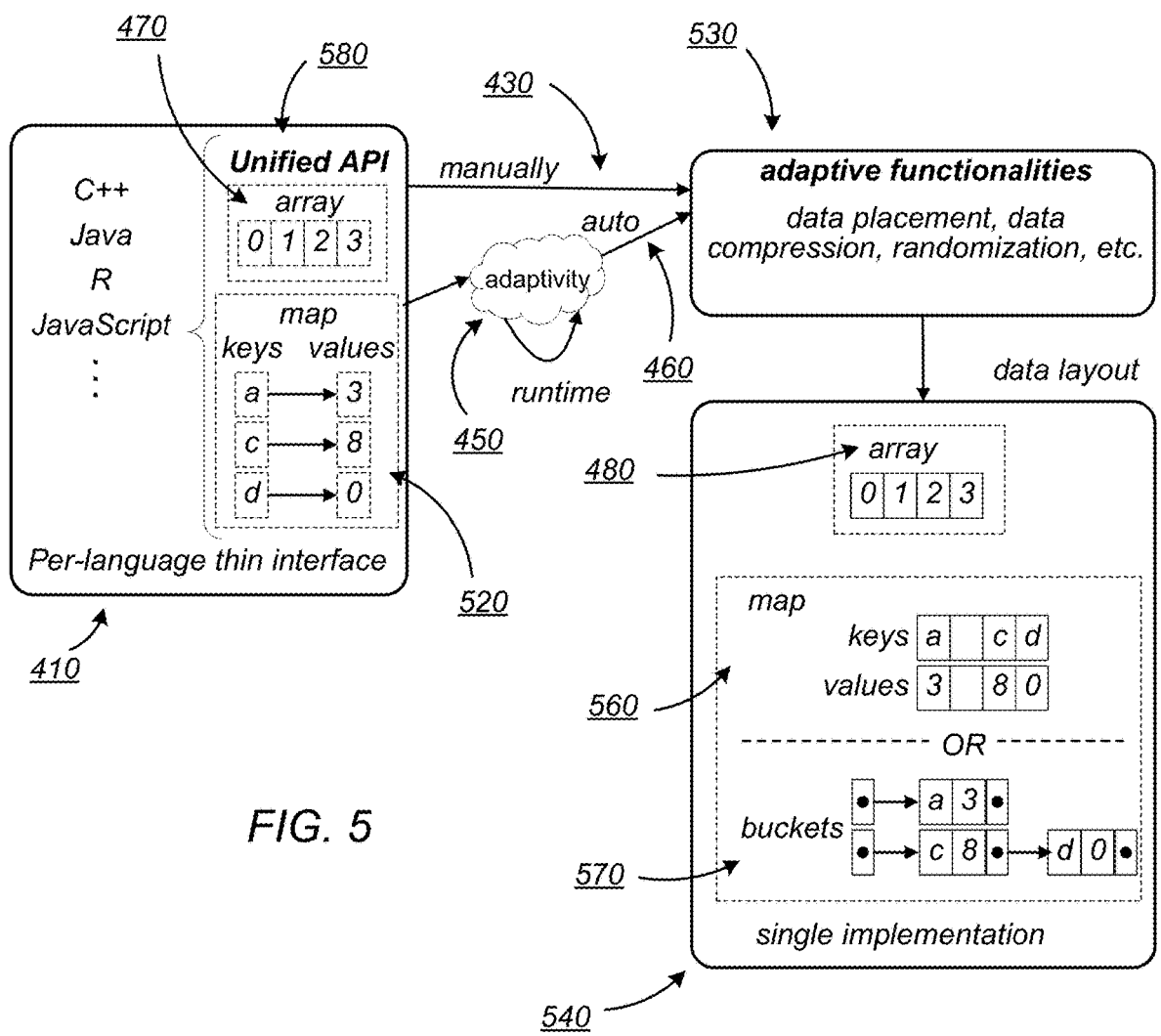
FIG. 5 is a logical diagram illustrating an example of accessing an adaptive data collection that includes multiple interfaces and functionalities.

While FIG. 4 illustrates an adaptive array and corresponding interface, similar implementations may be used for other types of collections as well. FIG. 5 is a logical diagram illustrating an example of accessing an adaptive data collection that includes multiple interfaces and data functionalities. Rather than illustrating a single array collection type 480, as in FIG. 4, FIG. 5 illustrates multiple collection types accessible via thin interfaces 410 (e.g., array 470 and map 520). Additionally, data layout 540 may include a single data layout 480 for the array collection type, but two different data layouts 460, 570 for the map collection type. According to the example embodiment of FIG. 5, map 520 may be implemented as either linked lists 570 representing buckets or as arrays representing trees, skip maps, etc. The determination of which alternate implementation (e.g., data layout) to use may be hidden from the user (e.g., programmer) in some embodiments, but the user may be able to specify which to use in other embodiments. Note that FIG. 5 illustrates only a few examples of possible implementations according to one example embodiment and that other implementations and/or data layouts may be utilized in other embodiments. Access to the underlying data structures may be provided by adaptive data functionalities 530 via unified API 580, which may provide different access models, such as array 510 and map 520, usable by application code to access the adaptive data collections (e.g., stored in data layout 540 in this example).

Additionally, adaptive data collections may perform aggregations with adaptive data arrays, which may be referred to as smart arrays herein, and which may be relevant to databases, and may also perform a number of graph analytics algorithms, which may be relevant to graph processing systems. Specifically for graph processing, a traditional way to store the graph data may be in compressed sparse row (CSR) format in which each vertex has an ID. Within the CSR, an edge array may concatenate the neighborhood lists of all vertices (e.g., forward edges in case of directed graphs) using vertex IDs, in ascending order. Another array may hold array indices pointing to the beginning of the neighborhood list of the vertices. Two other similar arrays (e.g., r_edge and r_begin) may hold the reverse edges for directed graphs. Additional arrays may be needed to store vertex and edge properties, as well as for some analytics algorithms and their output. Thus, adaptive data collections, such as smart arrays may be used to replace all these arrays, such as to exploit their adaptive data functionalities for graph analytics, according to some embodiments.

Even without exploiting smart data functionalities, the performance achieved from Java workloads may be similar to Java's built-in array types. Additionally, there may be trade-offs involving the consumption of various hardware resources, such as memory bandwidth and space. Programmers may need to choose the specific implementation that fits the target hardware, workload, inputs, and system activity. Moreover, different scenarios may require these trade-offs to be made in different programming languages. Adaptive data collections, as described herein may aid in solving these problems, according to some embodiments.

Adaptive data collections may support various NUMA-aware placements that need to be adapted to the workload and system, according to various embodiments, such as:

OS default. For NUMA-agnostic applications, or other applications that do not need to specify a data placement, the default OS data placement policy may be used. Depending on how the adaptive data collection is initialized, its physical location may vary from one socket (e.g., if one thread initializes the array) to random distribution across sockets (e.g., if multiple threads initialize the array).

Single socket. In some embodiments, the adaptive data collection's memory pages may be physically allocated on a specified socket. This placement may be beneficial or detrimental depending on the relative bandwidths, as well as the maximum compute capability of the given processors. In some cases the speedup of those threads that are local to the data may outweigh the slowdown of remote threads.

Interleaved. In some embodiments, the adaptive data collection's memory pages may be physically allocated across the sockets, such as in a round-robin fashion. This may be a default option to distribute memory space and local/remote memory accesses across sockets, but in some embodiments, there may be a bandwidth bottleneck on interconnects.

Figure 6A:
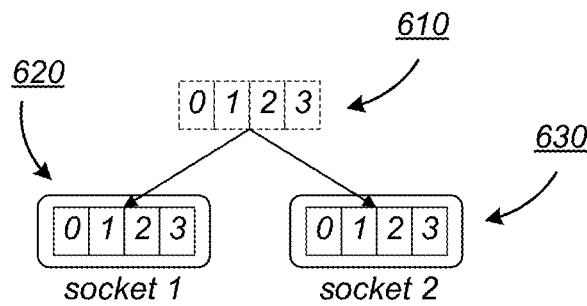
FIG. 6a is a logical diagram illustrating replication of an adaptive data collection across sockets in one embodiment.

Replicated. One replica of the adaptive data collection (or of the collection's data) may be placed on each socket in some embodiments. A conceptual example is shown in FIG. 6a which is a logical diagram illustrating replication of an adaptive data collection across sockets in one embodiment. As illustrated in FIG. 6a, array 610 is replicated on both sockets, resulting in replicated adaptive array 620 on socket 1 and replicated adaptive array 630 on socket 2, according to one example embodiment. Note that adaptive array 630 may not be replicated itself, but adaptive array 630 may replicate some or all of its internal state across multiple sockets, according to some embodiments. For example, without replication a single array may hold the array's data internal to the collection, whereas with replication, multiple arrays (e.g., 1 on each of multiple sockets) may hold the data while a corresponding array holding references to those arrays may be maintained as well. Thus, portions (e.g., most) of the internal state of the collection may be replicated while the reference array may be accessed/queried only occasionally, thereby potentially avoiding a bottleneck. All of these arrays (e.g., both the reference array and the data arrays on individual sockets) may be considered internal to the collection (e.g., the adaptive array) and therefore, even when data is replicated across multiple sockets, only a single adaptive array may be apparent from a user/programmer's point of view. In some embodiments, the placement illustrated by FIG. 6a may be considered the most performant solution for read-only or read-mostly workloads, such as analytics (since each thread may have fast local accesses to a collection's replica), but replication may come at the cost of a larger memory footprint as well as additional initialization time for replicas.

Figure 6B:
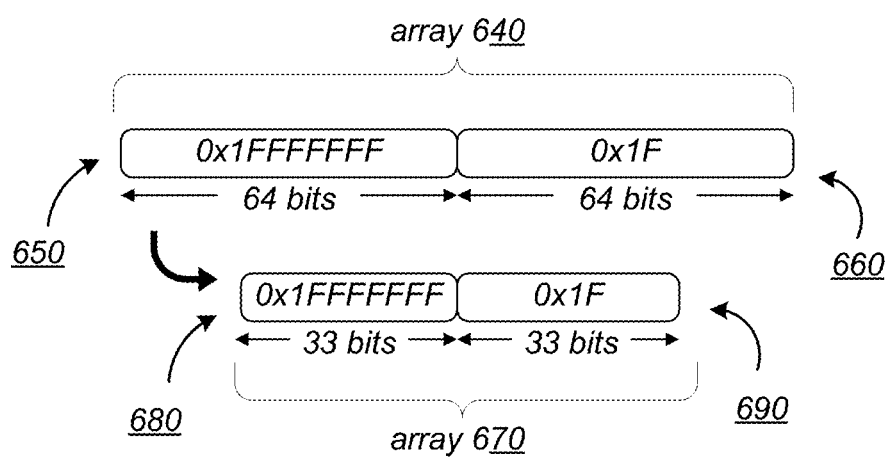
FIG. 6b is a logical diagram illustrating bit compressions of an adaptive data collection, according to one embodiment.

Bit compression may be considered a light-weight compression technique popular for many analytics workloads, such as column-store database systems as one example. Bit compression may use less than 64 bits for storing integers that require fewer bits. By packing the required bits consecutively across 64-bit words, bit compression can pack the same number of integers into a smaller memory space than the one required for storing the uncompressed 64-bit integers. For instance, FIG. 6b is a logical diagram illustrating bit compressions of an adaptive data collection, according to one embodiment. FIG. 6b shows, according to one example embodiment, an example of compressing an array 640 with two elements, 650 and 660, into a bit-compressed array 670 of two elements, 680 and 690, using 33 bits per element. The number of bits used per element may be the minimum number of bits required to store the largest element in the array in some embodiments.

Bit compression within adaptive data collections may decrease the dataset's memory space requirements, while increasing the number of values per second that can be loaded through a given bandwidth, according to some embodiments. Additionally, in some embodiments, bit compression may increase the CPU instruction footprint (e.g., since each processed element may need to be compressed when initialized and decompressed to a suitable format that the CPU can work with directly, such as 32 or 64 bits, when being accessed). However, this additional work (e.g., additional instructions required for bit compression and decompression compared to uncompressed elements) may be hidden (e.g., may not significantly affect overall performance) when iterating sequentially over a bit-compressed array that has a memory bandwidth bottleneck, potentially resulting in faster performance for the compressed array according to one embodiment.

In some embodiments, an adaptive data collection's implementation may be based on logically chunking the elements of a bitcompressed array into chunks of 64 numbers. This ensures that the beginning of the first and the end of the last number of the chunk are aligned to 64 bit words for all cases of bit compression from 1 bit to 64 bits. Thus, the same compression and decompression logic may be executed across chunks. While discussed above regarding chunks of 64 numbers, in some embodiments, other chunk sizes may be utilized depending on the exact nature and configuration of the machine and/or memory system being used.

Illustrated below is an example function (Function 1) including logic of an example "getter" (e.g., a method to obtain an element) of an adaptive data collection (e.g., an adaptive array) compressed with BITS number of bits. In the example function below, BITS may be a C++ class template parameter, so there may be 64 classes allowing much of the arithmetic operations to be evaluated at compile time. Additionally, in some embodiments, BITS may indicate a number bits supported directly by the CPU (e.g., 32, 64, etc.) in which case compression/decompression code may not be required, since the CPU may be able to work directly on the elements of the array. The example function below performs preparatory work to find the correct chunk index (line 1), the chunk's starting word in the array (lines 2-3), the corresponding chunk's starting bit and word (lines 4-5), the requested index's starting word in the array (line 6), and the mask to be used for extraction (line 7). If the requested element lies wholly within a 64-bit word (line 8), it is extracted with a shift and a mask (line 9). If the element lies between two words (line 10), its two parts are extracted and are combined to return the element (line 11). The example functions assumes little-endian encoding, however any suitable encoding may be used in different embodiments.

---

Function 1 - BitCompressedArray::get(index, replica)

1: chunk ← index / 64
2: wordsPerChunk ← BITS
3: chunkstart ← chunk * wordsPerChunk
4: bitInChunk ← (index % 64) * BITS
5: bitInWord ← bitInChunk % 64
6: word ← chunkStart + (bitInChunk / 64)
7: mask ← (1 << BITS) − 1
8: if bitInWord + BITS <= 64 then
9:   return (replica[word] >> bitInWord) & mask
10: else
11:   return ((replica[word] >> bitInWord) | (replica[word+1] << (64-bitInWord))) & mask Illustrated below is an example function (Function 2) illustrating initialization logic of an adaptive data collection (e.g., an adaptive array) compressed with BITS number of bits, according to one example embodiment. For instance, after performing the same preparatory work as the getter (described above regarding example function 1), the example init function below calculates whether the element needs to be split across two words (line 2). The init function may then initialize the element for each replica if the array is replicated (line 3). If the element wholly fits in the first word, its value is set (line 4). If it spills over to the next word (line 5), its second part is set in the next word (line 6). While not illustrated in the example function below, in some embodiments a thread-safe variant of the function may be implemented using atomic compare-and-swap instructions or using locks, such as having one lock per chunk. In cases of concurrent read and write accesses the user of adaptive data collections may need to synchronize the accesses.

Function 2 - BitCompressedArray:init(index, value)

```
1: /* ... same as lines 2-8 of Function 1 ... */
2: word2 ← chunkStart + ((bitInChunk + BITS) / 64)
3: for replica = 0 to replicas do
4:    data[replica][word] = (data[replica][word] &
         ~(mask<<bitInWord))|(value<<bitInWord)
5:    if word != word2 then
6:       data[replica][word2] = (data[replica][word] &
            ~(mask>>(64-bitInWord)))|(value>>(64-bitInWord))
```

Additionally, in order to optimize scans of an adaptive data collection, such as an adaptive array, which may be significant operations in analytics workloads, an adaptive data collection may support a function that can unpack a whole chunk of a bitcompressed collection. Illustrated below is an example function (Function 3) that shows unpack logic configured to condense consecutive getter operations for a complete chunk of a replica and output the 64 numbers of the chunk to a given output buffer, according to one example embodiment. After performing similar preparatory work (lines 1-4) as in Function 1 above, the function starts iterating over the chunk's elements (line 5). For every element, the function determines whether it is wholly within the current word (line 6). If it is, it is output (line 7) and the function continues to the next element (line 8). If the current element also finishes the current word (line 9), it is output (line 10), the bit index is reset to the current word (line 11), and the function continues to the next word (lines 12-13). If the current element crosses over to the next word (line 14), the element is made up from its two parts across the words and is output (lines 15-17), before continuing on to the next element (lines 18-20). The main loop of the function may be unrolled manually or automatically (by the compiler) according to various embodiments, such as to avoid the branches and permit compile-time derivation of the constants used.

Function 3 - BitCompressedArray::unpack(chunk, replica, out)

```
1: chunkStart ← chunk * wordsPerChunk
2: word ← chunkStart
3: value ← replica[word]
4: bitInWord ← 0
5: for i = 0 to 64 do
6:    if bitInWord + BITS < 64 then
7:       out[i] = (value >> bitInWord) & mask
8:       bitInWord += BITS
```

Function 3 - BitCompressedArray::unpack(chunk, replica, out)

```
9:    else if bitInWord + BITS == 64 then
10:      out[i] = (value >> bitInWord) & mask
11:      bitInWord = 0
12:      word++
13:      value = replica[word]
14:   else
15:      nextWord = word + 1
16:      nextWordValue = replica[nextWord]
17:      out[i] = mask & ((value >> bitInWord) | (nextWordValue
            << (64-bitInWord)))
18:      bitInWord = (bitInWord + BITS) - 64
19:      word = nextWord
20:      value = nextWordValue
```

Figure 7:
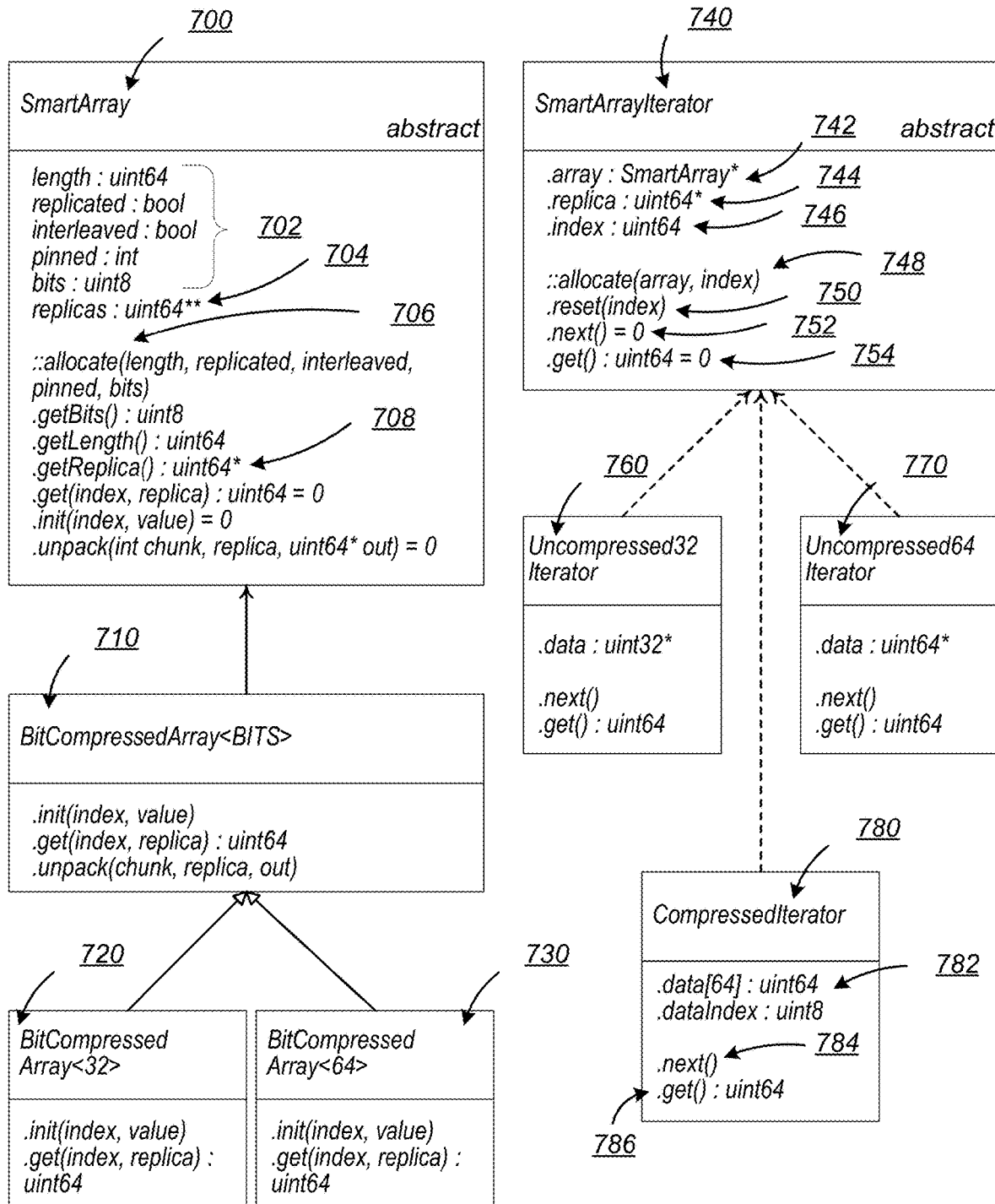
FIG. 7 is a logical diagram illustrating an example software model for implementing adaptive data collections, according to one embodiment.

FIG. 7 is a logical diagram illustrating an example software model for implementing adaptive data collections, according to one embodiment. Specifically, FIG. 7 shows a unified modeling language (UML) diagram including classes of an example adaptive array (e.g., SmartArray) and their associated APIs, such as the iterator API. The example SmartArray class in FIG. 7 is an abstract class holding the basic properties that signify whether the SmartArray is replicated, interleaved or pinned to a single socket, and the number of bits with which it is bit compressed, as illustrated by variables 702. If the SmartArray is replicated (i.e., if the SmartArray replicates its internal state), the replicas array 704 may hold a pointer per socket that points to the replicated data allocated on the corresponding socket. As described above, from a user/programmer's point of view there may appear to be only a single adaptive data collection with replication of the data structures hidden inside the adaptive data collection. If replication is not enabled, there may be a single replica in the replicas array. The allocate( ) static function 706 may create a new Smart Array using the concrete sub-classes depending on the bit compression, and may allocate the replica(s) considering the given data placement parameters. The getReplica( ) function 708 may be configured to return the replica corresponding to the socket of the calling thread. The remaining functions correspond to the pseudo code shown in example Functions 1-3 above.

The concrete sub-classes 710, 720 and 730 of SmartArray 700 may correspond to all cases of bit compression with a number of bits 1-64, according to the example embodiment. The cases of bit compression with 32 and 64 bits (e.g., sub-classes 720 and 730) are specialized in the example embodiment since they directly map to native integers as defined on the system of the example embodiment. Consequently, BitCompressedArray<32> and BitCompressedArray<64> may be implemented with simplified getter, initialization, and unpack functions that do not require shifting and masking, according to some embodiments.

In addition to a random access API of the Smart Array class, a forward iterator for efficient scans may be implemented, as illustrated by SmartArrayIterator 740 in FIG. 7. The forward iterator 740 may make it possible to hide replica selection as well as the unpacking of the compressed elements, according to some embodiments. In the example embodiment of FIG. 7, SmartArrayIterator is an abstract class holding a pointers 742, 744 and 746 to the referenced Smart Array, the target replica, and the current index of the iterator, respectively. A new iterator may be created by calling the allocate( ) static function 748. According to the example embodiment of FIG. 7, the allocate( ) function 748 sets the target replica by calling the given SmartArray's getReplica( ) function 708 to get the replica that corresponds to the socket of the calling thread, and finally constructs and returns one of the concrete sub-classes depending on the bit compression of the underlying SmartArray 700. In C++ the iterator may be allocated slightly differently when compiled into LLVM bitcode for use from the runtime cross-language compiler 130. For instance, the iterator may be allocated transparently in the runtime cross-language compiler's heap, such as to give the compiler the chance to additionally optimize the allocation when compiling the user's code (e.g., code that uses our iterator API). The reset( ) function 750 may reset the current index to what is given as the argument, the next( ) function 752 may move to the next index, while the get( ) function 754 may get the element corresponding to the current index, according to the example embodiment.

The example SmartArrayIterator 740 has three concrete subclasses 760, 770 and 780. Two (e.g., Uncompressed32Interator 760 and Uncompressed64Interator 770) correspond to the uncompressed cases with 32 and 64 bits per element, respectively, for which specialized versions using 32-bit and 64-bit integers directly may be used. The third (e.g., CompressedIterator 780) corresponds to all other cases of bit compression. The CompressedIterator 780 holds a buffer 782 for unpacking elements. When the next( ) function moves to the next chunk, it may call the Smart Array's unpack( ) function to fetch the next 64 elements into the buffer, while the get( ) function may return the element from the buffer corresponding to the current index, according to the example embodiment.

While described above regarding arrays, when utilized other adaptive data collections, in the case of bit compression, the iterator API may have to test whether a new chunk needs unpacking. This may generate a large number of branch stalls, which may not be evaluated speculatively and may increase CPU load. A different unified API for languages that support user-defined lambdas may be used in some embodiments. For example, in one embodiment the unified API may provide a bounded map( ) interface accepting a lambda and a range to apply it over. In comparison to the iterator API, the map interface may further improve performance as it may not stall on the branches because it is able to remove many of them, and to speculatively execute the lambda in the remaining cases, according to various embodiments.

While described above in terms of specific class, method, variable and function names, an adaptive data collection may be implemented using differing numbers of classes, methods, variables, functions, etc. which may be named differently than those described herein.

As noted previously, a thin API may be provided, such as to hide the runtime cross-language compiler's API calls to the entry points of a unified API. FIG. 4, discussed above shows a simplified example of an example Java wrapper class for an example adaptive data collection (e.g., SmartArray). The wrapper class stores the pointer to the native object of the SmartArray. The native pointer is given to the entry point functions. Entry points and wrapper classes only for the two abstract classes (e.g., SmartArray and SmartArray-Iterator) of our unified API are provided in the example embodiment illustrated by FIG. 4, discussed above.

However, entry points and wrapper functions may have an additional version where the user (e.g., code that accesses the adaptive data collection) may pass the number of bits with which the Smart Array is to be bit-compressed. Depending on the number of bits, the entry point branches off and redirects to the function of the correct sub-class, thus avoiding the overhead of a virtual dispatch and dispensing with the need to provide separate entry points to the sub-classes, according to some embodiments. Moreover, in some embodiments, the runtime cross-language compiler may avoid the branching in the entry points by profiling the number of bits during the interpreted runs and considering it as fixed during optimization and when applying just-in-time compilation.

Illustrated below is an example function (Function 4) showing one example of what the final experience may look like from a programmer's view using a simple example of an aggregation of an adaptive array in C++ and Java. The example below uses an iterator since the aggregation scans the adaptive array.

---

Function 4 aggregate( ) example in both C++ and Java

```
 1: // C++
 2: it = SmartArrayIterator::allocate(smartArray, 0);
 3: for (long i=0; i < smartArray.getLength( ); i ++) {
 4:   sum += it->get( );
 5:   it->next( );
 6: }
 7: // Java
 8: it = new SmartArrayIterator(smartArray, 0);
 9: long bits = GraalVM.profile(smartArray.getBits( ));
10: for (long i=0; i < smartArray.getLength( ); i++) {
11:   sum += it.get(bits);
12:   it.next(bits);
13: }
```
---

The C++ example above uses the abstract SmartArrayIterator class 740, but can immediately use a concrete subclass depending on the number of bits with which the Smart Array is bit-compressed in order to avoid any virtual dispatch overhead.

The example Java function is very similar to the example C++ function. It is executed with the runtime cross-language compiler 130. The versions of the thin API's functions that receive the number of bits are used. Additionally, the runtime cross-language compiler's API functionalities are used to "profile" the number of bits, such as to ensure that the compiler considers the number of bits fixed during compilation, as well as to incorporate the final code of the get( ) and next( ) functions of the concrete sub-class, thereby avoiding any virtual dispatch or branching overhead. For example, if the Smart Array is bit-compressed with 33 bits, the next( ) function may unpack every 64 elements immediately with the code of the BitCompressedArray<33>:: unpack( ) function, whereas if the Smart Array is uncompressed with 64 bits, then the get( ) and next( ) functions may be so simple that compiled code simply increases a pointer at every iteration of the loop without needing to allocate anything for the iterator, according to some embodiments.

The input data, the cost, benefit, and availability of the optimizations can vary depending on the machine, the algorithm in various embodiments. Table 1 describes the trade-offs, according to one embodiment.

TABLE 1

Trade-offs of Various Example Data Functionalities.

| Technique | Advantages | Disadvantages |
|---|---|---|
| Bit compression | Smaller memory footprint. Less memory bandwidth. | Extra CPU load per access. |

TABLE 1-continued

Trade-offs of Various Example Data Functionalities.

| Technique | Advantages | Disadvantages |
|---|---|---|
| Replication | Less interconnect traffic. Spreads load evenly across all memory channels. | More memory footprint. Time initializing replicas. Only for read-only data. |
| Interleaved | Effective use of bidirectional interconnect. Load on memory approximately equal across banks. | May leave memory bandwidth unused as threads stall on interconnect transfers. |
| Single Socket | Increase in speed on the local socket can outweigh the loss of performance elsewhere. | Only advantageous if the memory bandwidth is much higher than the interconnect bandwidth. |

An adaptivity mechanism 450 utilized with adaptive data collections may, in some embodiments, enable a more dynamic adaptation between alternative implementations at runtime, such as by considering the changes in the system load as other workloads start and finish, or the changes in utilization of main memory. Additionally, an adaptivity mechanism may in some embodiments re-apply its adaptivity workflow to select a potentially new set of adaptive data functionalities and data layouts for multiple adaptive data collections. This process may consider the concurrent workloads of all supported languages on each smart collection.

As described herein according to one example embodiment, the system may perform configuration selection to select a placement candidate for uncompressed data placement and, if possible, a placement candidate for compressed data placement. Then, analytics may be used to determine which configuration, including which placement candidates, to use. As noted above, a configuration may specify one or more data functionalities for the data collection. After determining which configuration to use, data collection may be configured according to the determined configuration. For instance, if a selected configuration specifies a NUMA-aware data placement scheme (e.g., OS default, single socket, replication, interleaved, etc.), the data collection may be configured according to the given data placement scheme. Similarly, if the selected configuration specifies a compression algorithm, the data collection may be configured to use that compression algorithm when storing and retrieving data of the collection.

Figure 8:
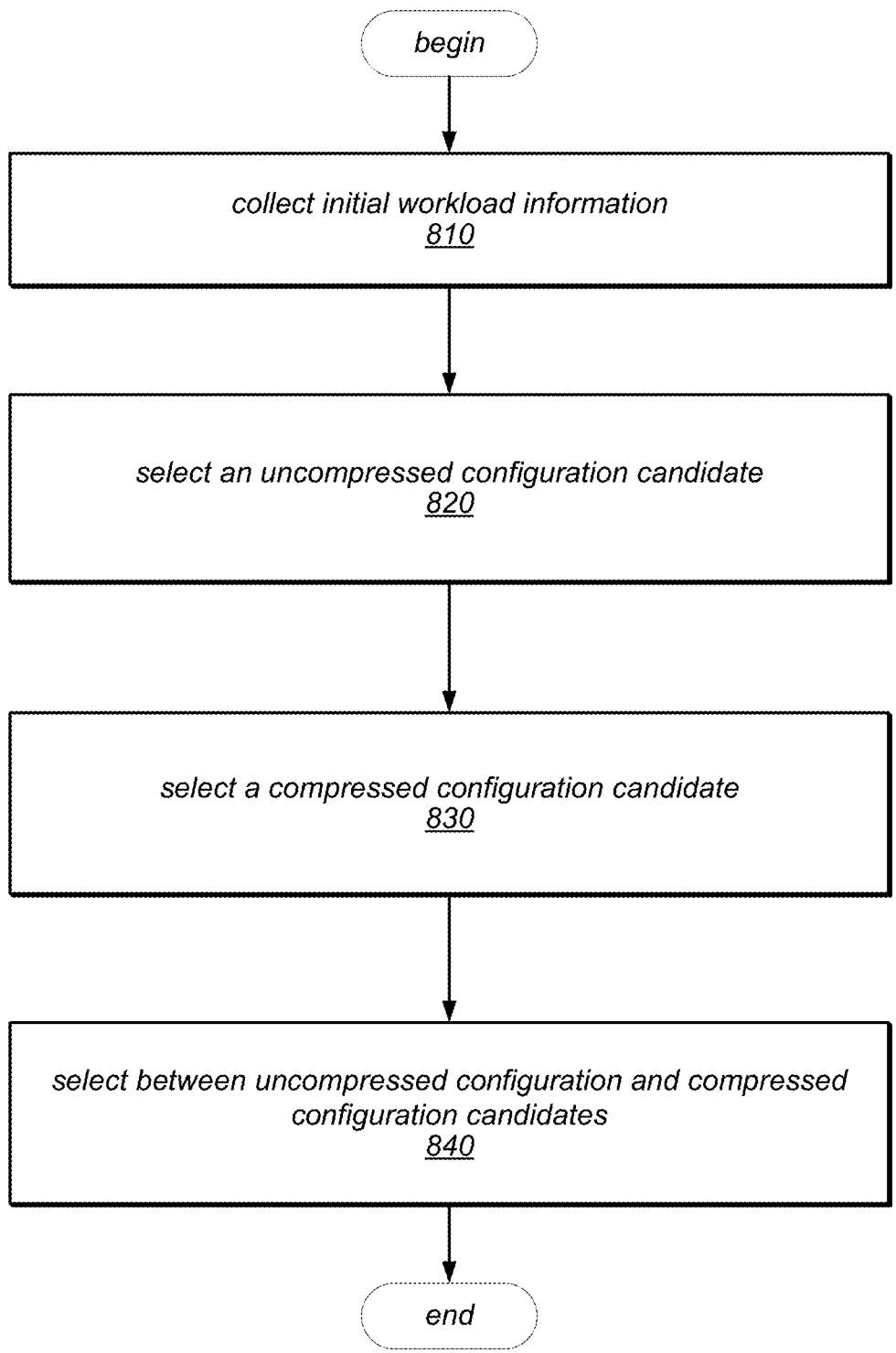
FIG. 8 is a flowchart illustrating one embodiment of a method for placement configuration selection, as described herein.

FIG. 8 is a flowchart illustrating one embodiment of a method for placement configuration selection, as described herein. As illustrated in block 810, the system may be configured to collect initial workload information according to one embodiment. In some embodiments, different configuration's resources needs may be predicted based on a small number of workload measurements and a particular configuration (e.g., a particular adaptable data collection configuration) may be selected for each scenario, while the decisions about which configurations to use may be made manually (e.g., by the programmer) or automatically (e.g., at runtime by the system), according to various embodiments.

Thus, a configuration may be selected based on one or more predicted resource requirements for the workload to be executed. For example, in one embodiment the configuration selection may be based on various inputs, referred to herein as initial workload information. For example, in one embodiment, the configuration selection may be based on three inputs, including, according to one example: 1) A specification of the machine containing the size of the system memory, the maximum bandwidth between components and the maximum compute capability available on each core; 2) a specification of performance characteristics of the data collections, such as the costs of accessing a compressed data item. This may be derived from performance counters and may be specific to the data collection and/or machine, but may not be specific not a given workload; and 3) information collected from hardware performance counters describing the memory, bandwidth, and processor utilization of the workload. Please note that the specific type of input used to select a configuration may vary from those described above and from embodiment to embodiment.

The configuration used when collecting the initial workload information may vary from embodiment to embodiment. For instance, in one embodiment an uncompressed interleaved placement may be used with an equal number of threads on each core. Interleaving may provide symmetry in execution and, as the interconnect links on many processors may be independent in each direction, the bandwidth available to perform the restructuring of the memory may be effectively doubled, thereby potentially reducing the time to change data placement if restructuring on the fly is implemented, according to one embodiment.

In some embodiments, information from hardware performance counters may be collected from one or more profiling runs (e.g., executions) of the same workload. In some embodiments, the profiling runs may be previous iterations of an iterative workload (e.g., PageRank iterating to convergence). Alternatively, in another embodiment, one could collect workload information from early batches of a loop over the data collection, and restructure the array on the fly.

Figure 9:
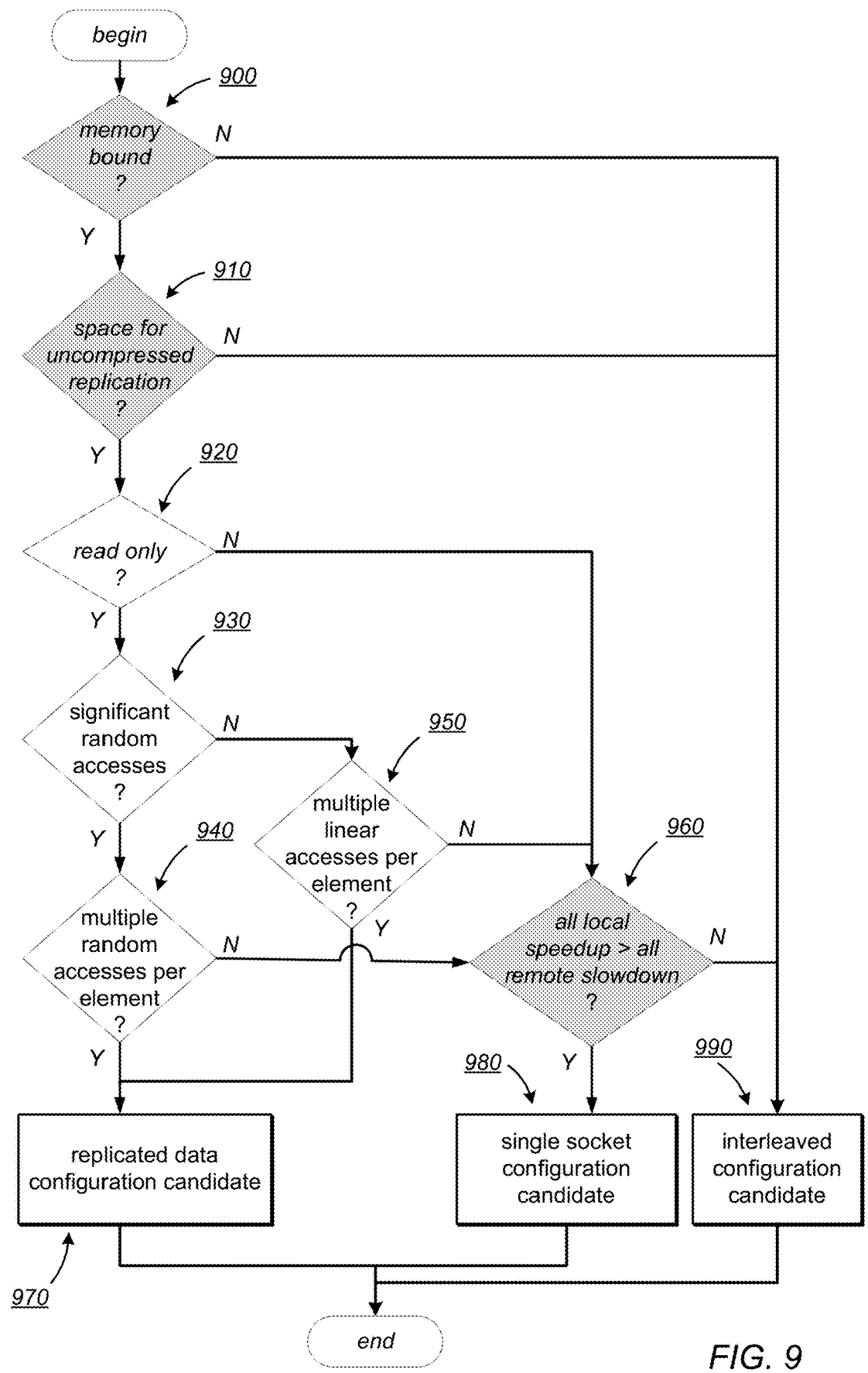
FIG. 9 is a flowchart illustrating one method for uncompressed placement candidate selection according to one example embodiment.

In some embodiment, the system may be configured to select an uncompressed configuration placement candidate, as in block 820. Turning now to FIG. 9, which is a flowchart illustrating one method for candidate selection with uncompressed placement of an adaptive data collection according to one example, embodiment. In some embodiments, choosing a placement for compression may require some of the tests to be moved forward in order to determine if compression is possible before considering which data placement to use. For example, every access may require a number of words to be loaded, making random accesses more expensive for compressed data than uncompressed data. Decisions illustrated in FIG. 9 are split into two categories: a) software characteristics based on information provided by the programmer, compiler, etc. such as numbers of iterations and whether the accesses are read-only, and b) runtime characteristics, denoted in grey, based on measurements of the workload, according to one embodiment.

As illustrated by decision block 900, the system may first determine whether the workload is not memory-bound. If the workload is not memory bound, as illustrated by the negative output of decision block 900, the system may then select an interleaved configuration as a candidate, as in block 990. If however, the workload is memory-bound, as indicated by the positive output of decision block 900, the system may then determine whether there is space sufficient for uncompressed replication, as in decision block 910. For example, replicating data collections, or single socket allocation, requires that enough memory be available on each socket. There may be different versions of this test for compressed and uncompressed data as compression can make replication possible where uncompressed data would not fit otherwise.

If, as indicated by the negative output of decision block 910, there is not enough space for uncompressed replication, the system may select an interleaved configuration as a candidate, as in block 990. If, however, there is enough space for uncompressed replication, as indicated by the positive output of decision block 910, the system may then determine whether the data collection is read only as in decision block 920. If the data collection is read only, as indicated by the positive output of decision block 920, the system may then determine whether the workload includes significant random accesses, as in decision block 930. For instance, if a workload contains many random accesses, then the additional latency cost may affect the point at which replication is worthwhile. Thus, the system may be configured to analyze and compare the number of random accesses of the data collection against a threshold, that may be predetermined and/or configurable according to various embodiments. The determination of whether there are significant random accesses, and/or the threshold used for such a determination, may be (or may be considered) a machine-specific bound, in some embodiments.

If the workload includes significant random accesses, as indicated by the positive output of decision block 930, it may then be determined whether the workload includes multiple random accesses per element, as in decision block 940. For example, there may be a time cost to initialize replicated data and sufficient accesses may be required to amortize this cost. The bounds (e.g., the thresholds) for this may be machine-specific and may vary depending on whether the accesses are random or linear, according to some embodiments. Thus, the system may be configured to determine whether there multiple random accesses per element. If so, as indicated by the positive output of decision block 940, the system may select a replicated data configuration as a candidate, as in block 970.

Returning to decision block 920, if the workload is not read only, as indicated by the negative output of decision block 920, the system may determine whether the total local speedup is greater than the total remote slowdown, as in decision block 960. For example, for some workloads on some architectures, it may be better to keep all data on a single socket. In some embodiments, this strategy may work when the ratio between remote and local access bandwidth is very high. In some cases, the speedup for some threads performing only local accesses may outweigh the slowdown of the threads performing remote accesses. Thus, in some embodiments, The system may be configured to compare the total local access bandwidth to the total remote bandwidth to determine whether the total local speedup is greater than the total remote slowdown.

To determine whether the speedup for some threads performing only local accesses outweighs the slowdown of the threads performing remote accesses, as in decision block 960, the system may be configured to perform one or more of the following calculations. The example calculations below are for a two-socket machine, however in other embodiments machines with differing numbers of sockets may be used with similar, but suitably modified, calculations.

First, the system may calculate how quickly a socket could compute if relieved of any memory limitations. In some embodiments, the notion of execution rate (exec) may be used to represent the instructions executed per time unit. Additionally, frequency scaling may make instructions per cycle (IPC) an inappropriate metric in some embodiments. Thus:

$$\text{improvement}_{exec} = \text{exec}_{max} / \text{exec}_{current}$$

Second, the system may be configured to use the "used" and "available" bandwidth (bw) both between sockets and to main memory in order to calculate how fast the local socket could compute with all local accesses assuming that the remote socket is saturating the interconnect link, according to one embodiment. To account for bandwidth lost due to latency, the bandwidth values taken from the machine description may scaled to the maximum bandwidth used by the workload during measurement. For example, if a 90% utilization of the link that is a bottleneck is achieved (e.g., measured), the maximum performance of all links may be scaled to 90% to reflect the maximum possible utilization. Thus:

$$\text{improvement}_{bw} = (\text{bw}_{max\ memory} - \text{bw}_{max\ interconnect}) / \text{bw}_{current\ memory}$$

The minimum of these two improvements may be taken as the maximum speedup of the local socket: $\text{speedup}_{local}$. Finally, the maximum speedup of the remote socket with all remote accesses may be calculated. This value may be expected to be less than 1, indicating a slowdown:

$$\text{speedup}_{remote} = \text{bw}_{max\ interconnect} / \text{bw}_{current\ memory}$$

If the average of the local and remote speedup is greater than 1, then having the data on a single socket may be beneficial, according to some embodiments.

Thus, if the system determines, such as by using the above calculations that the local speedup is greater than the remote slowdown, as indicated by the positive output of decision block 960, the system may select a single socket configuration as a candidate as in block 980. If however, the local speedup is not greater than the remote slowdown, as indicated by the negative output of decision block 960, the system may select an interleaved configuration as a candidate, as in block 990.

Returning to decision block 930, if as indicated by the negative output, it is determined that there are no significant random accesses, the system may be configured to determine whether the workload includes (e.g., performs) multiple linear accesses per element, as in block 950. As with determining whether the workload includes (e.g., performs) multiple random accesses per element, discussed above, there may be a time cost to initialize replicated data and sufficient accesses may be required to amortize this cost. The bounds (e.g., the thresholds) for this may be machine-specific and may vary depending on whether the accesses are random or linear, according to some embodiments. If the system determines that there are multiple linear access per element, as indicated by the positive output of decision block 950, the system may select a replicated data configuration as a candidate, as in block 970. Alternatively, if it is determined that there are not multiple accesses per element, as indicated by the negative output of decision block 950, processing may proceed to decision block 960, discussed above.

While the method illustrated by the flowchart in FIG. 9 is illustrated and described using particular steps in a particular order, those steps are only for ease of description. However, in various embodiments, the functionality of the method of FIG. 9 may be performed in a different order, some steps may be combined, steps may be removed and/or additional ones included.

Figure 10:
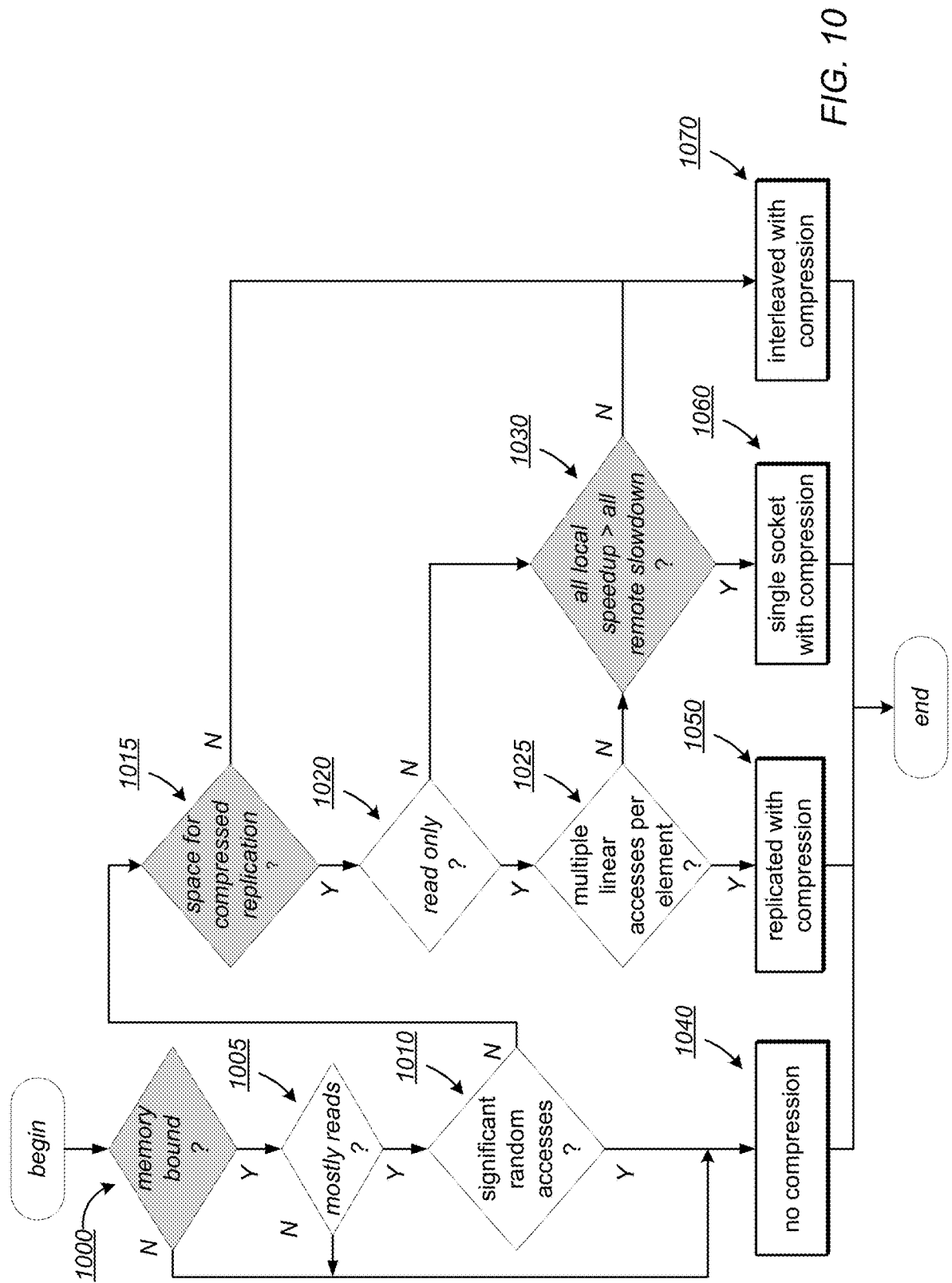
FIG. 10 is a flowchart illustrating one method for compressed placement candidate selection according to one example embodiment.

Returning now to FIG. 8, the system may be configured to select a compressed configuration candidate, as in block 830. As discussed above, in some embodiments, the system may be configured to select both a candidate configuration with compression and a candidate configuration without compression. FIG. 10 is a flowchart illustrating one method for candidate selection with compressed placement of an adaptive data collection according to one example, embodiment. Decisions illustrated in FIG. 10 are split into two categories: a) software characteristics based on information provided by the programmer, compiler, etc. such as numbers of iterations and whether the accesses are read-only, and b) runtime characteristics, denoted in grey, based on measurements of the workload, according to one embodiment.

As in decision block 1000, the system may determine whether the workload is memory bound. If it is determined that the workload is memory bound, as indicated by the positive output of decision block 1000, the system may then determine whether the workload includes mostly reads, as in decision block 1005. When determining whether the workload includes mostly reads, the system may compare the percentage of accesses that are reads to a threshold (whether predetermined or configurable). If as indicated by the positive output of decision block 1005, the workload is determined to include mostly reads, the system may then determine whether there are a significant number of random accesses, as in decision block 1010.

For instance, if a workload includes many random accesses, then the additional latency cost may affect the point at which replication is worthwhile. Thus, the system may be configured to analyze and compare the number of random accesses of the data collection against a threshold, that may be predetermined and/or configurable according to various embodiments. The determination of whether there are significant random accesses, and/or the threshold used for such a determination, may be (or may be considered) a machine-specific bound, in some embodiments. If the workload includes significant random accesses, as indicated by the positive output of decision block 1010, the system may then determine not to use compression, as in block 1040. Similarly, if the system determines that the workload is not memory bound, as indicated by the negative output of decision block 1000, or if the system determines that the workload does not include mostly reads, as indicated by the negative output of decision block 1005, the system may determine not to use compression, as in block 1040.

If it is determined that the workload does not include significant random accesses, as indicated by the negative output of decision block 1010, the system may then determine whether there is space sufficient for compressed replication, as in decision block 1015. For example, replicating data collections, or single socket allocation, requires that enough memory be available on each socket. There may be different versions of this test for compressed and uncompressed data as compression can make replication possible where uncompressed data would not fit otherwise. If it is determined that there is space for compressed replication, as indicated by the positive output of decision block 1015, the system may then determine whether the data collection is read only as in decision block 1020. If the data collection is read only, as indicated by the positive output of decision block 1020, the system may then determine whether the workload includes multiple linear accesses per element, as in decision block 1025. As described above regarding block 950 of FIG. 9, there may be a time cost to initialize replicated data and sufficient accesses may be required to amortize this cost. The bounds and/or thresholds used to determine whether enough linear accesses per element exist, may in some embodiments be machine-specific.

If the workload includes multiple linear accesses per element, as indicated by the positive output of decision block 1025, select a replicated data configuration with compression as a candidate, as in block 1050. Alternatively, if it is determined that there are not significant random accesses, as indicated by the negative output of decision block 1025, the system may be configured to determine whether the total local speedup is greater than the total remote slowdown, as in decision block 1030. The system may determine whether the total local speedup is greater than the total remote slowdown in the same manner as that described above regarding block 960 of FIG. 9, except using computed values for execution rate (i.e., $exec_{compressed}$) and bandwidth (i.e., $bw_{compressed}$), discussed below. If it is determined that the local speedup is greater than the remote slowdown, as indicated by the positive output of decision block 1030, the system may then determine to select a single socket configuration with compression as a candidate, as in block 1060. If however, it is determined that the local speed up is not greater than the remote slowdown, as indicated by the negative output of decision block 1030, the system may determine to select an interleaved configuration with compression as a candidate, as in block 1070.

While the method illustrated by the flowchart in FIG. 10 is illustrated and described using particular steps in a particular order, those steps are only for ease of description. However, in various embodiments, the functionality of the method of FIG. 10 may be performed in a different order, some steps may be combined, steps may be removed and/or additional ones may be included.

Returning to FIG. 8, the system may be configured to select between the uncompressed configuration candidate and the compressed configuration candidate, as in block 840. For example, after selecting placement candidates as described above, the system may be configured to determine whether to use the selected candidate with or without compression. In some embodiments, a first step in determining whether to use compression may be to add to the profile of the compression candidate the additional computation effort ($exec_{compressed}$) required to perform the compression. To determine this, the system may also need to know, in addition to the current compute rate ($exec_{current}$), the number of accesses per second (#accesses) as well as the cost per access resulting from the extra CPU load that needs to be executed (as cost). In some embodiments, the cost of decompression may vary with the compression ratio, since the number of values that can be extracted per instruction changes. Thus, in one embodiment, the computation effort required to perform the compression may be determined according to the following formula:

$$exec_{compressed} = exec_{current} + \#accesses \cdot cost$$

The reduction in bandwidth may also be calculated in a similar fashion, using a compression ratio (r) [0 . . . 1] of the compressed and the uncompressed size of the elements ($elem_{size}$) as below:

$$bw_{compressed} = bw_{current} \qquad memory - \#accesses \cdot (1-r) \cdot elem_{size}$$

Using computed values, as discussed above, for the compressed case and the measured values for the uncompressed case, the system may estimate each placement's speedup. For instance, the system may be configured to compute, for each placement, the ratio of the maximum compute rate relative to the current rate. Thus, the system may obtain each candidate's speedup if the workload is not memory-bound. Next, for each socket the system may compute the ratio of the maximum memory bandwidth for each candidate placement relative to the current bandwidth. This gives the socket speedup assuming the workload is not compute-bound. Finally, for each socket, the system may take the minimum of their two ratios as the socket's estimated speedup and average these for the configurations' estimated speedup. The system may then choose the configuration predicted to be the fastest, according to some embodiments.

As noted above, adaptive data collections and/or corresponding adaptive data functionalities may be implemented within a runtime system that supports parallel loops with dynamic distribution of loop iterations between worker threads. In some embodiments, adaptive data collections and/or corresponding adaptive data functionalities may be developed in a given programming language, such as C++, regardless of what language(s) may be used to access the data collections. This approach may be considered to provide a number of potential advantages, such as: (i) in C++ the memory layout of the adaptive data collections may be controlled by interfacing with the operating system (OS), such as by making system calls for NUMA-aware data placement, (ii) by careful design of the cross-language (e.g., Java to C++) interface, the runtime cross-language compiler may be used to inline the implementation into other languages and thereby to potentially optimize it alongside user code, and (iii) by having a single implementation, re-implementing functionality for multiple languages may be avoided while still enabling multi-language workloads, according to various embodiments. However, the particular example advantages mentioned above may or may not be achieved in any given implementation of adaptive data collections.

Figure 11:
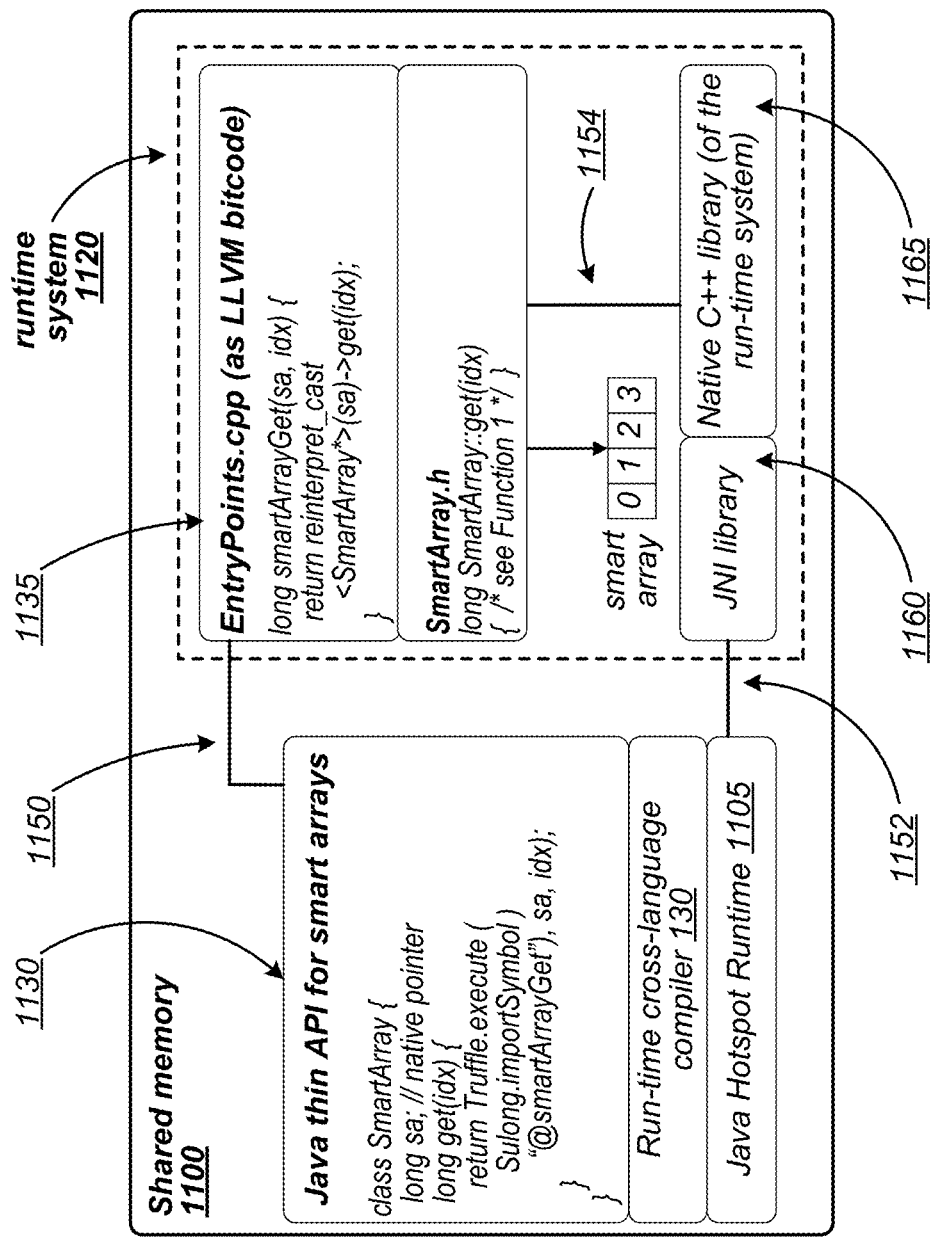
FIG. 11 is a logical block diagram illustrating one example adaptive data collection accessible via the Java programming language, according to one embodiment.

In some embodiments, a thin API may be provided, such as to hide the runtime cross-language compiler's API calls to the entry points of a unified API. FIG. 11 is a logical block diagram illustrating one example of an adaptive data collection accessible via the Java programming language, according to one embodiment. FIG. 11 shows conceptually how, according to one example embodiment, the C++ implementation may be exposed to Java.

In addition, FIG. 11 depicts three different interoperability paths 1150, 1152 and 1154 via which the native world of the runtime system 1120 may interact with the managed world of Java. The first interoperability path 1150 may, in some embodiments, be considered central to the efficient interoperability between C++ implemented adaptive data collections and Java. This may be the fastest interoperability path, and may be made available by the runtime cross-language compiler 130 to enable access to adaptive data collections for any supported guest language, including Java. Through this path, the ability of the runtime cross-language compiler to optimize and/or compile the adaptive data functionalities (e.g., implemented in C++). For example, the LLVM bitcode 1135 of Entrypoints.cpp may be optimized and/or compiled with the code 1130.

Additionally, one or more entry point functions may be exposed via a unified API of the adaptive data collections. The entry points may be compiled with into bitcode (e.g., LLVM bitcode) which runtime cross-language compiler 130 may execute. Additionally, in some embodiments, these entry points may be seamlessly used by guest languages running on top of runtime cross-language compiler 130.

In some embodiments, a per-language thin API layer 1130 that mirrors the unified API may be provided. For instance, one example is shown in FIG. 11 for the case of Java according to one example implementation. One purpose for using per-language thin API layer 1130 may be to hide the API of the runtime cross-language compiler 130 and make accessing the entry points more convenient. Note that no adaptive functionality may be re-implemented in Java. Instead, the SmartArray::get( ) function illustrated in FIG. 11 may incorporate the C++ logic for potential replicas and/or bit decompression. The function may be exposed as an entry point that is compiled into bitcode (e.g., LLVM bitcode) and executed by the runtime cross-language compiler 130. The runtime cross-language compiler 130 may then execute user Java code, the Java thin API (including the adaptive data collection functionality) and dynamically optimize and compile the multi-language application (e.g., the application accessing the adaptive data collection).

Two additional interoperability paths that may be used for accessing components used by adaptive data collections. For instance, interoperability path 1152 may be via JNI and unsafe (e.g., code that is generally unsafe, but sometimes required, esp. within low level code) methods 1160. This path may exist for any Java application, however, JNI may be slow for array accesses and unsafe may not be interoperable, according to some embodiments. Thus, interoperability path 1151 may be used to access the runtime system's native functionality for parallel loop scheduling, in some embodiments. The third interoperability path 1154 may be the runtime cross-language compiler's native function interface (NFI) capability for the runtime compiled code to call into precompiled native libraries, such as the native library 1165 of the runtime system. In some embodiments, this may be the slowest path since NFI, similar to JNI, may need both pre- and post-processing.

The systems, techniques, methods and/or mechanisms described herein for implementing adaptable data collections may be applicable to any application/system that uses data collections, and specifically arrays, for storing and processing data (e.g., database management systems such as SAP HANA, MS SQL Server, etc., as well as graph processing system such as Oracle PGX, Oracle Database, and Neo4j, among others). These systems may be configured to implement and employ adaptable data collections, such as to exploit the language-independent adaptive optimizations described herein for NUMA-awareness and bit compression.

Example Computing System

Figure 12:
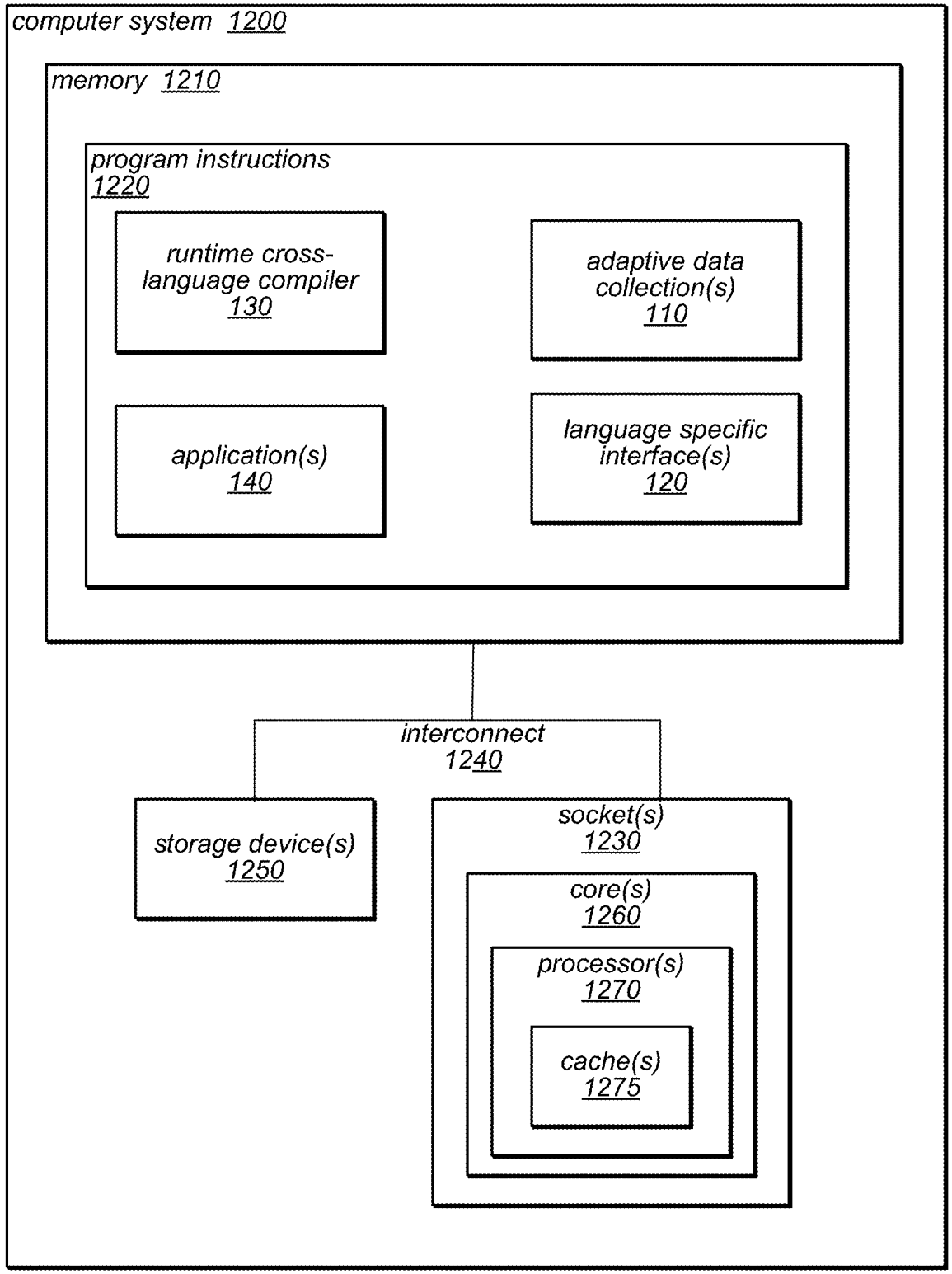
FIG. 12 is a logical block diagram illustrating one embodiment of a computing system that is configured to implement the methods, mechanisms and/or techniques described herein.

The techniques and methods described herein for Detection, Modeling and Application of Memory Bandwidth Patterns may be implemented on or by any of a variety of computing systems, in different embodiments. For example, FIG. 12 is a block diagram illustrating one embodiment of a computing system that is configured to implement such techniques and methods, as described herein, according to various embodiments. The computer system 1200 may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc., or in general any type of computing device.

Some of the mechanisms for Detection, Modelling and Prediction of Memory Access Patterns, as described herein, may be provided as a computer program product, or software, that may include a non-transitory, computer-readable storage medium having stored thereon instructions, which may be used to program a computer system 1200 (or other electronic devices) to perform a process according to various embodiments. A computer-readable storage medium may include any mechanism for storing information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, etc.)

In various embodiments, computer system 1200 may include one or more processors 1270; each may include multiple cores, any of which may be single- or multi-threaded. For example, multiple processor cores may be included in a single processor chip (e.g., a single processor 1270), and multiple processor chips may be included in computer system 1200. Each of the processors 1270 may include a cache or a hierarchy of caches 1275, in various embodiments. For example, each processor chip 1270 may include multiple L1 caches (e.g., one per processor core) and one or more other caches (which may be shared by the processor cores on a single processor). The computer system 1200 may also include one or more storage devices 1250 (e.g. optical storage, magnetic storage, hard drive, tape drive, solid state memory, etc.) and one or more system memories 1210 (e.g., one or more of cache, SRAM, DRAM, RDRAM, EDO RAM, DDR 10 RAM, SDRAM, Rambus RAM, EEPROM, etc.). In some embodiments, one or more of the storage device(s) 2450 may be implemented as a module on a memory bus (e.g., on interconnect 1240) that is similar in form and/or function to a single in-line memory module (SIMM) or to a dual in-line memory module (DIMM). Various embodiments may include fewer or additional components not illustrated in FIG. 12 (e.g., video cards, audio cards, additional network interfaces, peripheral devices, a network interface such as an ATM interface, an Ethernet interface, a Frame Relay interface, etc.)

The one or more processors 1270, the storage device(s) 1220, and the system memory 1210 may be coupled to the system interconnect 1240. One or more of the system memories 1210 may contain program instructions 1220. Program instructions 1220 may be executable to implement runtime cross-language compiler 130, adaptive data collection(s) 110, language specific interface(s) 120, and/or application(s) 140 as well as other programs/components configured to one or more of the systems, methods and/or techniques described herein.

Program instructions 1220 may be encoded in platform native binary, any interpreted language such as Java™ byte-code, or in any other language such as C/C++, the Java™ programming language, etc., or in any combination thereof. In various embodiments, implement runtime cross-language compiler 130, adaptive data collection(s) 110, language specific interface(s) 120, and/or application(s) 140 may each be implemented in any of various programming languages or methods. For example, in one embodiment, implement runtime cross-language compiler 130, adaptive data collection(s) 110, language specific interface(s) 120, and/or application(s) 140 may be based on the Java programming language, while in other embodiments they may be written using the C or C++ programming languages. Moreover, in some embodiments, implement runtime cross-language compiler 130, adaptive data collection(s) 110, language specific interface(s) 120, and/or application(s) 140 may not be implemented using the same programming language.

Although the embodiments above have been described in considerable detail, numerous variations and modifications will become apparent to those skilled in the art once the above disclosure is fully appreciated. For example, although many of the embodiments are described in terms of particular types of operations that support synchronization within multi-threaded applications that access particular shared resources, it should be noted that the techniques and mechanisms disclosed herein for accessing and/or operating on shared resources may be applicable in other contexts in which applications access and/or operate on different types of shared resources than those described in the examples herein and in which different embodiments of the underlying hardware that supports persistent memory transactions described herein are supported or implemented. It is intended that the following claims be interpreted to embrace all such variations and modifications.

What is claimed:

1. A computer-implemented method, comprising:
   configuring a data collection according to a first configuration to provide a first data functionality of the data collection, the data collection comprising data and one or more methods of a language-independent application programming interface (API), wherein the first data functionality comprises access to at least a portion of the one or more methods of the language-independent API, and wherein the first configuration is selected based at least in part on one or more predicted resource requirements of a workload;
   collecting, subsequent to the configuring, performance information during execution of the workload within a platform-independent virtual environment, the execution comprising executing the one or more methods of the data collection to access the data of the data collection; and
   reconfiguring the data collection according to a second configuration to provide a second data functionality of the data collection, wherein the second data functionality comprises access to at least another portion of the one or more methods of the language-independent API different from the portion of the one or more methods of the language-independent API of the first data functionality, and wherein the second configuration is selected based at least in part on the collected performance information.

2. The computer-implemented method of claim 1, wherein the one or more methods of the language-independent API are developed using a first programming language, and wherein the execution of the workload is performed by an application developed using a second programming language different from the first programming language.

3. The computer-implemented method of claim 1, wherein the method is implemented by a computer including multiple sockets each including multiple processor cores.

4. The computer-implemented method of claim 1, wherein the first data functionality and the second data functionality individually comprise one or more of:
   an operating system default NUMA-aware data placement for the data of the data collection;
   a single socket NUMA-aware data placement for the data of the data collection;
   an interleaved NUMA-aware data placement for the data of the data collection;
   a replicated NUMA-aware data placement for the data of the data collection;
   a compression scheme for the data of the data collection;
   an indexing scheme for data elements of the data collection; or
   a data synchronization scheme for the data collection.

5. The computer-implemented method of claim 1, further comprising determining the one or more predicted resource requirements based at least in part on one or more of:
  a specification of a computer implementing the method, comprising at least one of:
    a size of a memory, a maximum bandwidth between hardware components of the computer, or a maximum computing capacity available on each of the processor cores of the computer;
  a specification of performance characteristics of the data collection based at least in part on one or more performance counters of the computer; or
  information collected during one or more profiling runs of the workload.

6. The computer-implemented method of claim 1, wherein the data collection is configured to organize the data of the data collection as one of a bag, a set, an array, or a map.

7. The computer-implemented method of claim 1, further comprising:
  selecting the first configuration, the selecting comprising:
    assigning the first configuration from among a first candidate configuration and a second candidate configuration based at least in part on, the one or more predicted resource requirements of the workload, the first candidate configuration specifying an uncompressed data functionality and the second candidate configuration specifying a compressed data functionality, wherein the uncompressed data functionality specifies an uncompressed data layout for the data of the data collection, and wherein the compressed data functionality specifies a compressed data layout for the data of the data collection.

8. A system, comprising:
  a computing device comprising one or more processors and a memory coupled to the one or more processors, the memory comprising program instructions executable by the one or more processors to implement a platform-independent virtual environment configured to:
    configure a data collection according to a first configuration to provide a first data functionality of the data collection, the data collection comprising data and one or more methods of a language-independent application programming interface (API), wherein the first data functionality comprises access to a portion of the one or more methods of the language-independent API, and wherein the first configuration is selected based at least in part on one or more predicted resource requirements of a workload;
    collect, subsequent to the configuring, performance information during execution of the workload, the execution comprising executing the one or more methods of the data collection to access the data of the data collection; and
    reconfigure the data collection according to a second configuration to provide a second data functionality of the data collection, wherein the second data functionality comprises access to another portion of the one or more methods of the language-independent API different from the portion of the one or more methods of the language-independent API of the first data functionality, and wherein the second configuration is selected based at least in part on the collected performance information.

9. The system of claim 8, wherein the one or more methods of the language-independent API are developed using a first programming language, and wherein the execution of the workload is performed by an application developed using a second programming language different from the first programming language.

10. The system of claim 8, wherein the computing device comprises multiple sockets each including multiple processor cores.

11. The system of claim 8, wherein the first data functionality and the second data functionality individually comprise one or more of:
  an operating system default NUMA-aware data placement for the data of the data collection;
  a single socket NUMA-aware data placement for the data of the data collection;
  an interleaved NUMA-aware data placement for the data of the data collection;
  a replicated NUMA-aware data placement for the data of the data collection;
  a compression scheme for the data of the data collection;
  an indexing scheme for data elements of the data collection; or
  a data synchronization scheme for the data collection.

12. The system of claim 8, the platform-independent virtual environment further configured to determine the one or more predicted resource requirements based at least in part on one or more of:
  a specification of a computer implementing the method, comprising at least one of:
    a size of a memory, a maximum bandwidth between hardware components of the computer, or a maximum computing capacity available on each of the processor cores of the computer;
  a specification of performance characteristics of the data collection based at least in part on one or more performance counters of the computer; or
  information collected during one or more profiling runs of the workload.

13. The system of claim 8, wherein the data collection is configured to organize the data of the data collection as one of a bag, a set, an array, or a map.

14. The system of claim 8, the platform-independent virtual environment further configured to:
  select the first configuration from among a first candidate configuration and a second candidate configuration based at least in part on, the one or more predicted resource requirements of the workload, the first candidate configuration specifying an uncompressed data functionality and the second candidate configuration specifying a compressed data functionality, wherein the uncompressed data functionality specifies an uncompressed data layout for the data of the data collection, and wherein the compressed data functionality specifies a compressed data layout for the data of the data collection.

15. One or more non-transitory computer readable storage media storing program instructions that, when executed on or across one or more processors, cause the one or more processors to implement a platform-independent virtual environment to perform:
  configuring a data collection according to a first configuration to provide a first data functionality of the data collection, the data collection comprising data and one or more methods of a language-independent application programming interface (API), wherein the first data functionality comprises access to a portion of the one or more methods of the language-independent API, and wherein the first configuration is selected based at least in part on one or more predicted resource requirements of a workload;

collecting, subsequent to the configuring, performance information during execution of the workload, the execution comprising executing the one or more methods of the data collection to access the data of the data collection; and reconfiguring the data collection according to a second configuration to provide a second data functionality of the data collection, wherein the second data functionality comprises access to another portion of the one or more methods of the language-independent API different from the portion of the one or more methods of the language-independent API of the first data functionality, wherein the second configuration is selected based at least in part on the collected performance information.

16. The one or more non-transitory computer readable storage media as recited in claim 15, wherein the one or more methods of the language-independent API are developed using a first programming language, and wherein the execution of the workload is performed by an application developed using a second programming language different from the first programming language.

17. The one or more non-transitory computer readable storage media as recited in claim 15, wherein the method is implemented by a computer including multiple sockets each including multiple processor cores.

18. The one or more non-transitory computer readable storage media as recited in claim 15, wherein the first data functionality and the second data functionality individually comprise one or more of:

an operating system default NUMA-aware data placement for the data of the data collection;

a single socket NUMA-aware data placement for the data of the data collection;

an interleaved NUMA-aware data placement for the data of the data collection;

a replicated NUMA-aware data placement for the data of the data collection;

a compression scheme for the data of the data collection;

an indexing scheme for data elements of the data collection; or a data synchronization scheme for the data collection.

19. The one or more non-transitory computer readable storage media as recited in claim 15, the platform-independent virtual environment further performing determining the one or more predicted resource requirements based at least in part on one or more of:

a specification of a computer implementing the method, comprising at least one of:

a size of a memory, a maximum bandwidth between hardware components of the computer, and a maximum computing capacity available on each of the processor cores of the computer;

a specification of performance characteristics of the data collection based at least in part on one or more performance counters of the computer; or information collected during one or more profiling runs of the workload.

20. The one or more non-transitory computer readable storage media as recited in claim 15, the platform-independent virtual environment further performing:

selecting the first configuration from among a first candidate configuration and a second candidate configuration based at least in part on, the one or more predicted resource requirements of the workload, the first candidate configuration specifying an uncompressed data functionality and the second candidate configuration specifying a compressed data functionality, wherein the uncompressed data functionality specifies an uncompressed data layout for the data of the data collection, and wherein the compressed data functionality specifies a compressed data layout for the data of the data collection.

\* \* \* \* \*